(12) United States Patent
Abe

(10) Patent No.: US 9,958,654 B2
(45) Date of Patent: May 1, 2018

(54) ZOOM LENS AND IMAGE PICKUP APPARATUS INCLUDING THE SAME

(71) Applicant: CANON KABUSHIKI KAISHA, Tokyo (JP)

(72) Inventor: Hirofumi Abe, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days. days.

(21) Appl. No.: 15/252,302

(22) Filed: Aug. 31, 2016

(65) Prior Publication Data
US 2017/0090167 A1 Mar. 30, 2017

(30) Foreign Application Priority Data

Sep. 24, 2015 (JP) ................................. 2015-186577

(51) Int. Cl.
| | | |
|---|---|---|
| *G02B 15/14* | (2006.01) | |
| *G02B 9/34* | (2006.01) | |
| *G02B 15/173* | (2006.01) | |
| *G02B 5/00* | (2006.01) | |
| *G02B 15/22* | (2006.01) | |
| *G02B 27/00* | (2006.01) | |
| *G02B 27/64* | (2006.01) | |
| *G02B 9/00* | (2006.01) | |
| *G02B 15/167* | (2006.01) | |

(Continued)

(52) U.S. Cl.
CPC ........... *G02B 15/173* (2013.01); *G02B 5/005* (2013.01); *G02B 15/22* (2013.01); *G02B 27/0025* (2013.01); *G02B 27/646* (2013.01); *G02B 9/00* (2013.01); *G02B 9/34* (2013.01); *G02B 13/006* (2013.01); *G02B 13/009* (2013.01); *G02B 13/0045* (2013.01); *G02B 13/18* (2013.01); *G02B 15/14* (2013.01); *G02B 15/167* (2013.01); *G02B 15/177* (2013.01); *G02B 15/20* (2013.01)

(58) Field of Classification Search
CPC .. G02B 27/0025; G02B 15/20; G02B 13/009; G02B 15/14; G02B 15/177; G02B 13/0045; G02B 5/005; G02B 9/34; G02B 15/22; G02B 15/167; G02B 9/00; G02B 13/006; G02B 13/18
USPC .................. 359/683–687, 715, 740, 771, 774
See application file for complete search history.

(56) References Cited

U.S. PATENT DOCUMENTS

| | | | |
|---|---|---|---|
| 7,420,746 B2 | 9/2008 | Miyazawa | |
| 7,616,386 B2 * | 11/2009 | Kimura | ................ G02B 15/161 359/687 |

FOREIGN PATENT DOCUMENTS

| | | | |
|---|---|---|---|
| JP | 2006171431 A | 6/2006 | |
| JP | 2008158160 A | 7/2008 | |

* cited by examiner

*Primary Examiner* — Evelyn A Lester
(74) *Attorney, Agent, or Firm* — Rossi, Kimms & McDowell LLP

(57) ABSTRACT

Provided is a zoom lens including, in order from an object side to an image side, first to fourth lens units having positive, negative, positive, and positive refractive powers, respectively. In the zoom lens, during zooming, the first lens unit and the third lens unit do not move, and the second lens unit and the fourth lens unit move with loci different from each other, the first lens unit consists of, in order from the object side to the image side, a negative lens G11, a positive lens G12, and a positive lens G13, and an Abbe number ν1n of a material of the negative lens G11, an average value N1ave of refractive indices of materials of three lenses (Continued)

included in the first lens unit, a focal length f1 of the first lens unit, and a focal length f2 of the second lens unit are appropriately set.

17 Claims, 19 Drawing Sheets

(51) Int. Cl.
    *G02B 13/00*         (2006.01)
    *G02B 13/18*         (2006.01)
    *G02B 15/20*         (2006.01)
    *G02B 15/177*       (2006.01)

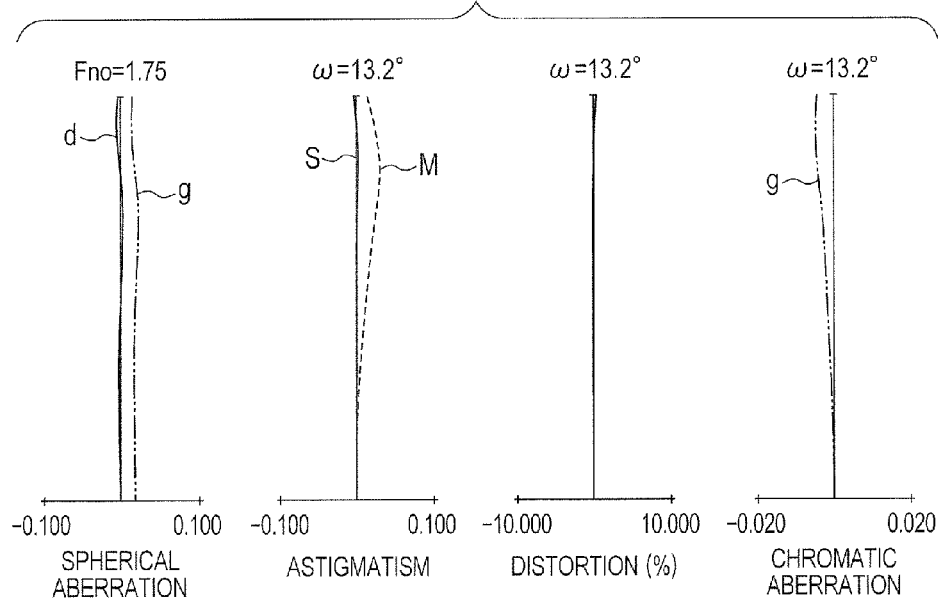
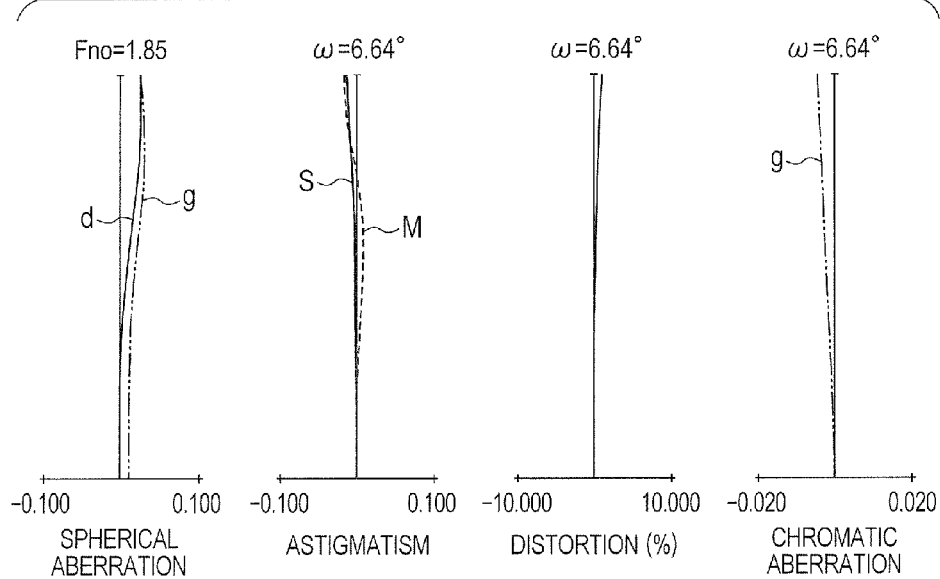

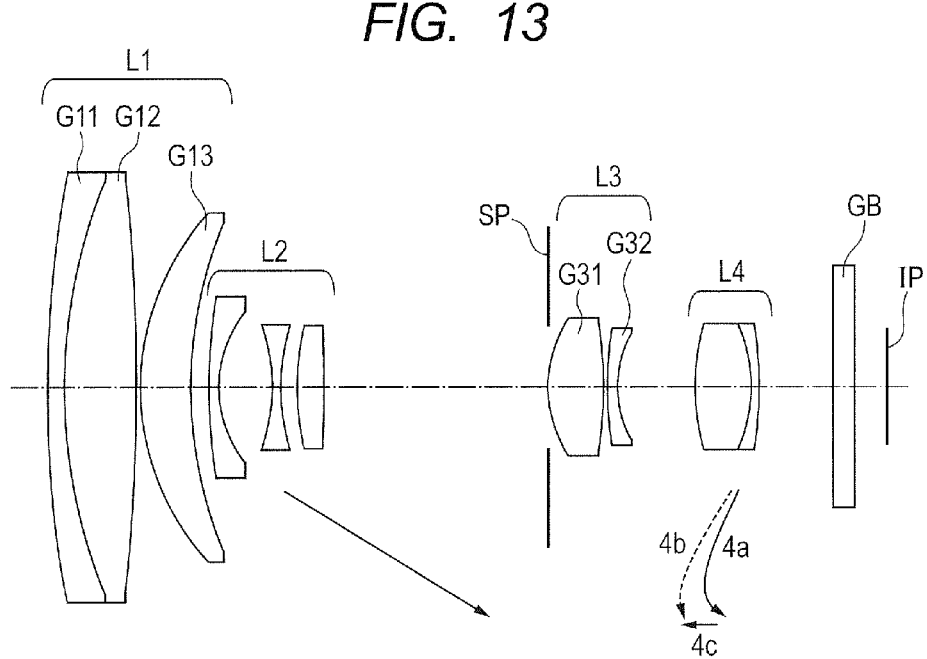
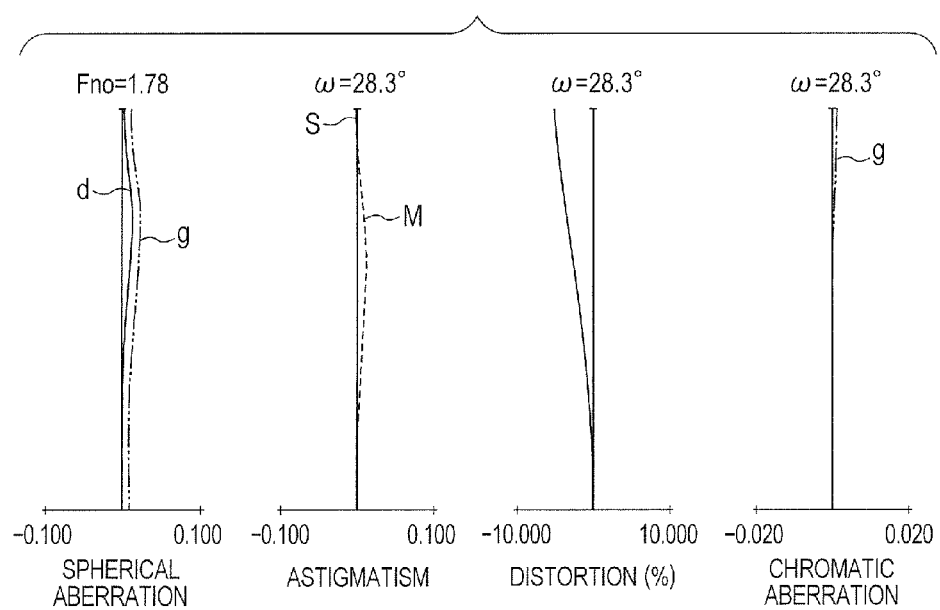

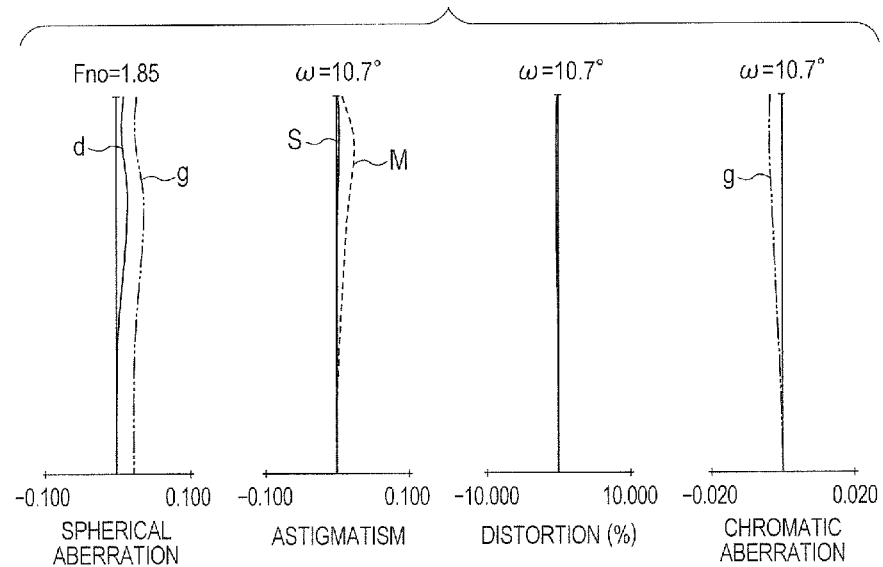
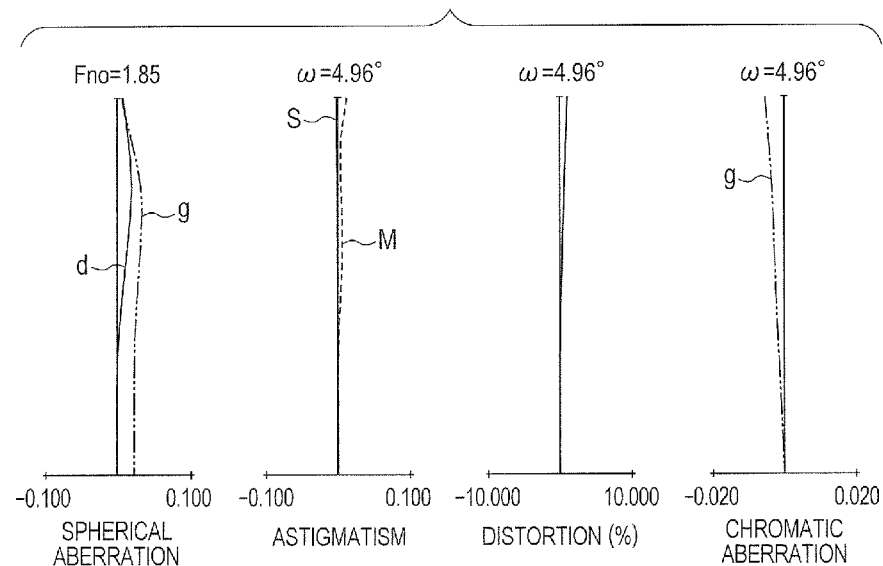

ZOOM LENS AND IMAGE PICKUP APPARATUS INCLUDING THE SAME

BACKGROUND OF THE INVENTION

Field of the Invention

The present invention relates to a zoom lens and an image pickup apparatus including the zoom lens, which are suitable for an image pickup apparatus using an image pickup element, e.g., a video camera, an electronic still camera, a broadcasting camera, or a monitoring camera, or an image pickup apparatus, e.g., a silver-halide film camera.

Description of the Related Art

In recent years, an image pickup apparatus using an image pickup element is increased in functionality, and the entire apparatus is downsized. Accordingly, as an image pickup optical system to be used in the image pickup apparatus, a compact zoom lens having a short total lens length and a large aperture ratio is demanded.

In Japanese Patent Application Laid-Open Nos. 2006-171431 and 2008-158160, there is described a zoom lens including, in order from an object side to an image side, four lens units having positive, negative, positive, and positive refractive powers, respectively. In the zoom lens described in Japanese Patent Application Laid-Open Nos. 2006-171431 and 2008-158160, the second lens unit and the fourth lens unit are configured to move during zooming.

In this case, in order to achieve a four-unit zoom lens with high optical characteristics while being small as a whole and having a larger aperture ratio, it is important to appropriately set the refractive powers of the respective lens units forming the zoom lens, movement conditions of the respective lens units during zooming, and the like.

For example, it is important to appropriately set the refractive power and the lens configuration of a first lens unit, the refractive power of a second lens unit, and the like. If those configurations are not appropriately set, it is difficult to obtain a zoom lens that is small as a whole, and has a large aperture ratio and high optical characteristics over the entire zoom range.

SUMMARY OF THE INVENTION

According to one embodiment of the present invention, there is provided a zoom lens, including, in order from an object side to an image side:

a first lens unit having a positive refractive power;
a second lens unit having a negative refractive power;
a third lens unit having a positive refractive power; and
a fourth lens unit having a positive refractive power, in which during zooming, the first lens unit and the third lens unit are configured not to move, and the second lens unit and the fourth lens unit are configured to move with loci different from each other, in which the first lens unit consists of, in order from the object side to the image side, a negative lens G11, a positive lens G12, and a positive lens G13, and in which the following conditional expressions are satisfied:

$$15.0 < \nu 1n < 22.0;$$

$$1.7 < N1\text{ave} < 2.5; \text{ and}$$

$$2.0 < |f1/f2| < 5.0,$$

where $\nu 1n$ represents an Abbe number of a material of the negative lens G11, N1ave represents an average value of refractive indices of materials of three lenses included in the first lens unit, f1 represents a focal length of the first lens unit, and f2 represents a focal length of the second lens unit.

Further features of the present invention will become apparent from the following description of exemplary embodiments with reference to the attached drawings.

BRIEF DESCRIPTION OF THE DRAWINGS

FIG. 2B is aberration diagrams of the zoom lens of Example 1 at an intermediate zoom position.

FIG. 2C is aberration diagrams of the zoom lens of Example 1 at a telephoto end.

FIG. 13 is a lens cross-sectional view of a zoom lens according to Example 7 of the present invention.

FIG. 14A is aberration diagrams of the zoom lens of Example 7 at the wide angle end.

FIG. 14B is aberration diagrams of the zoom lens of Example 7 at the intermediate zoom position.

FIG. 14C is aberration diagrams of the zoom lens of Example 7 at the telephoto end.

DESCRIPTION OF THE EMBODIMENTS

Now, a zoom lens and an image pickup apparatus including the zoom lens according to an embodiment of the present invention are described with reference to the attached drawings. A zoom lens according to the present invention includes, in order from an object side to an image side: a first lens unit having a positive refractive power; a second lens unit having a negative refractive power; a third lens unit having a positive refractive power; and a fourth lens unit having a positive refractive power. During zooming, the first lens unit and the third lens unit are configured not to move, whereas the second lens unit and the fourth lens unit are configured to move with loci different from each other. An interval between adjacent lens units is changed during zooming.

Figure 1:
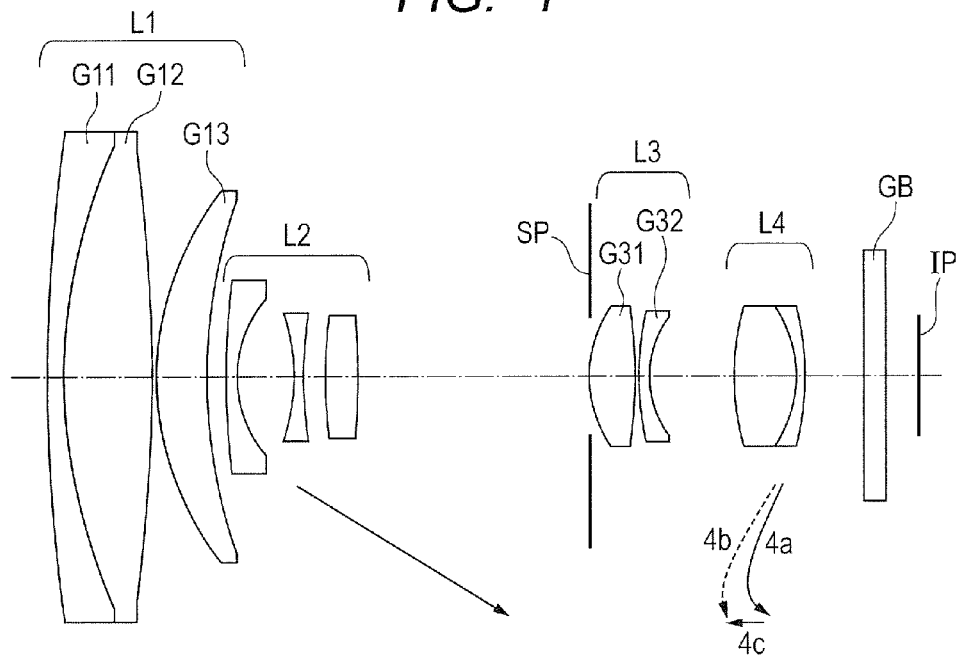
FIG. 1 is a lens cross-sectional view of a zoom lens according to Example 1 of the present invention.
Figure 2A:
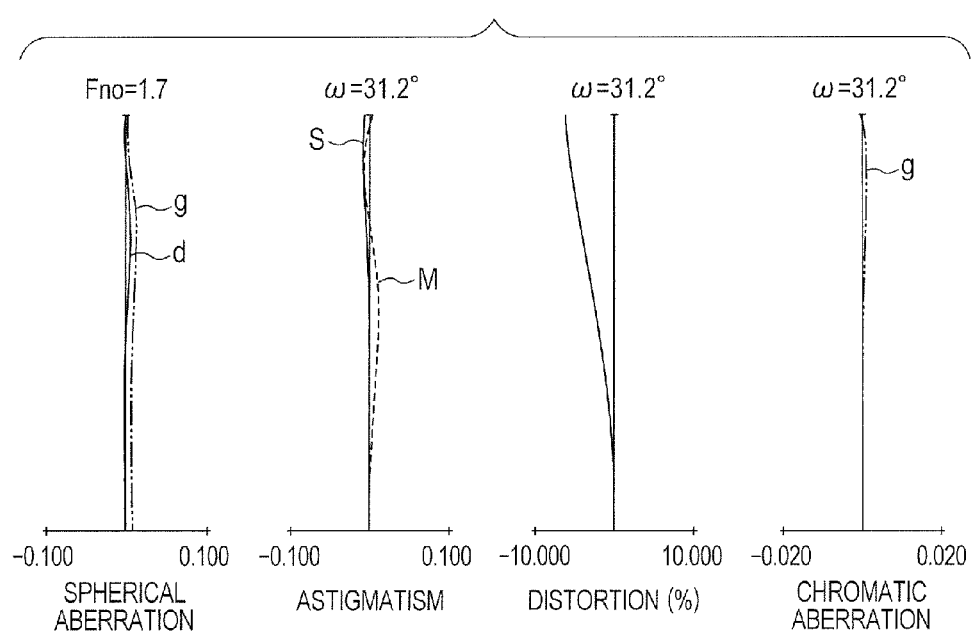
FIG. 2A is aberration diagrams of the zoom lens of Example 1 at a wide angle end.
Figure 3:
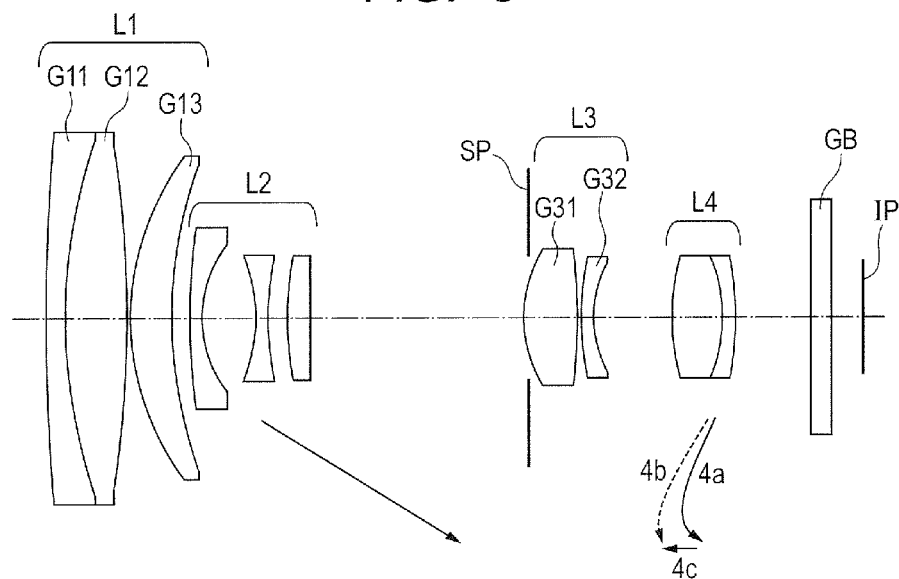
FIG. 3 is a lens cross-sectional view of a zoom lens according to Example 2 of the present invention.
Figure 4A:
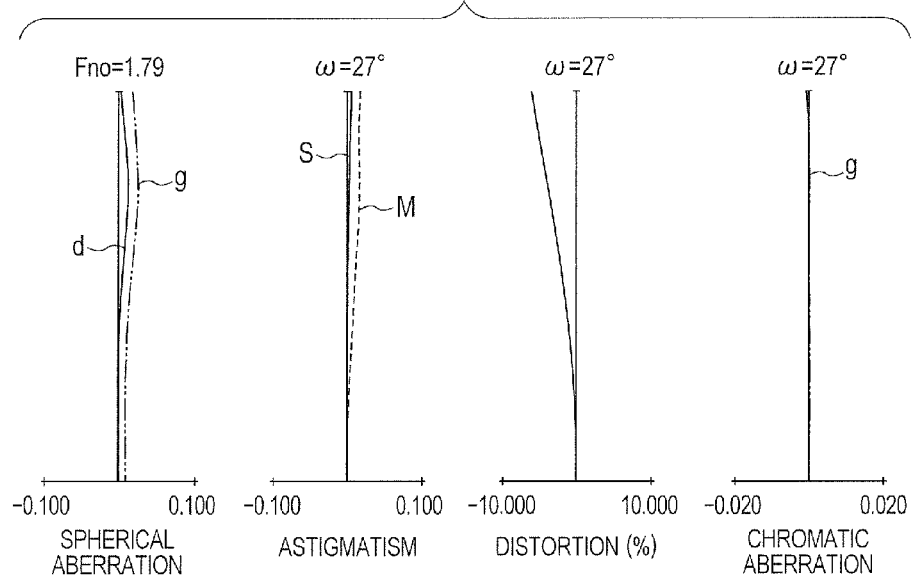
FIG. 4A is aberration diagrams of the zoom lens of Example 2 at the wide angle end.
Figure 4B:
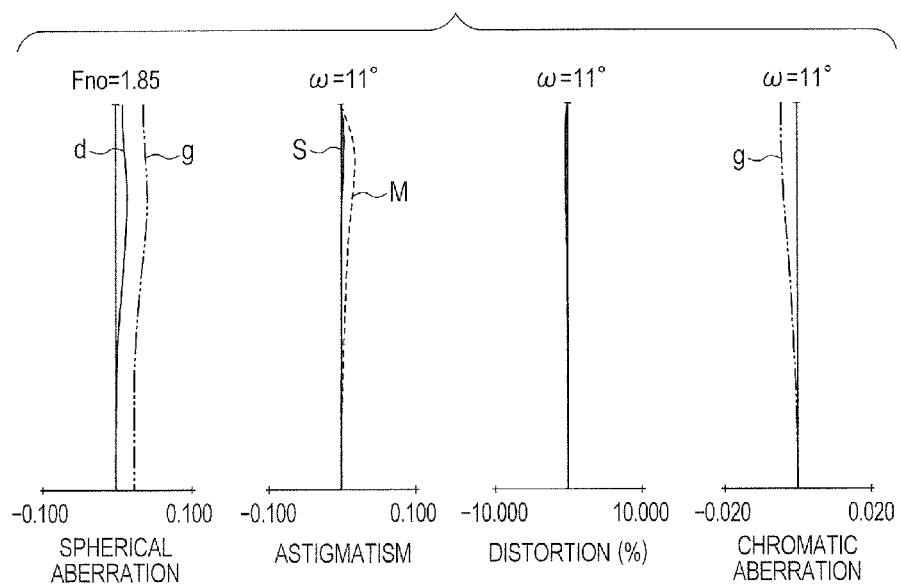
FIG. 4B is aberration diagrams of the zoom lens of Example 2 at the intermediate zoom position.
Figure 4C:
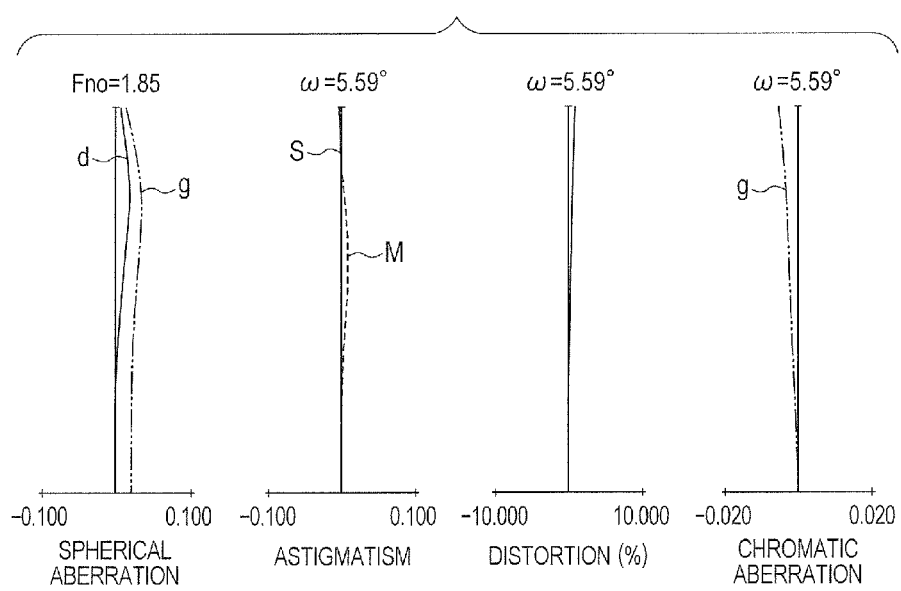
FIG. 4C is aberration diagrams of the zoom lens of Example 2 at the telephoto end.

FIG. 1 is a lens cross-sectional view of a zoom lens according to Example 1 of the present invention at a wide angle end (short focal length end). FIG. 2A, FIG. 2B, and FIG. 2C are aberration diagrams of the zoom lens of Example 1 at the wide angle end, an intermediate zoom position, and a telephoto end (long focal length end), respectively. The zoom lens of Example 1 has a zoom ratio of 4.85 and an F-number of from 1.81 to 1.85. FIG. 3 is a lens cross-sectional view of a zoom lens according to Example 2 of the present invention at the wide angle end. FIG. 4A, FIG. 4B, and FIG. 4C are aberration diagrams of the zoom lens of Example 2 at the wide angle end, the intermediate zoom position, and the telephoto end, respectively. The zoom lens of Example 2 has a zoom ratio of 4.85 and an F-number of from 1.79 to 1.85.

Figure 5:
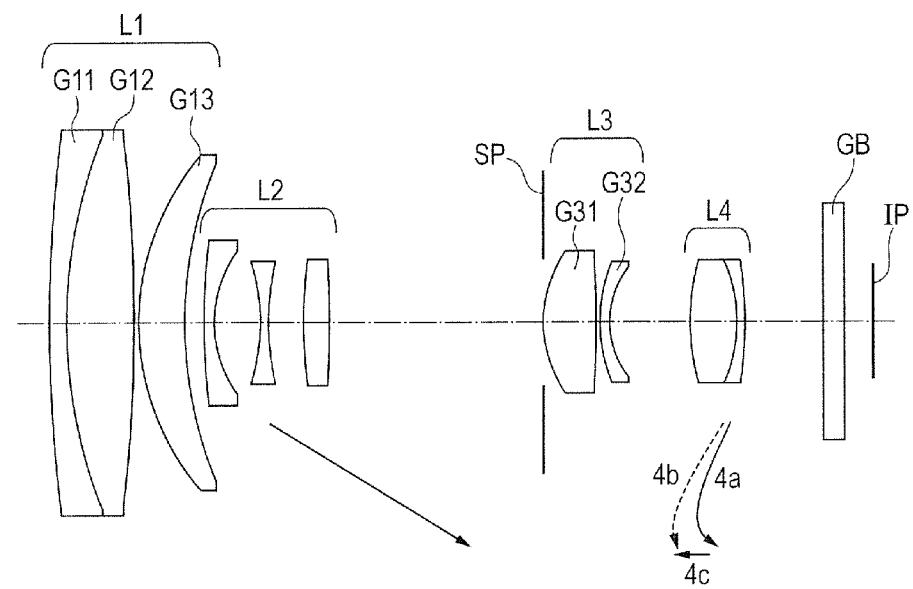
FIG. 5 is a lens cross-sectional view of a zoom lens according to Example 3 of the present invention.
Figure 6A:
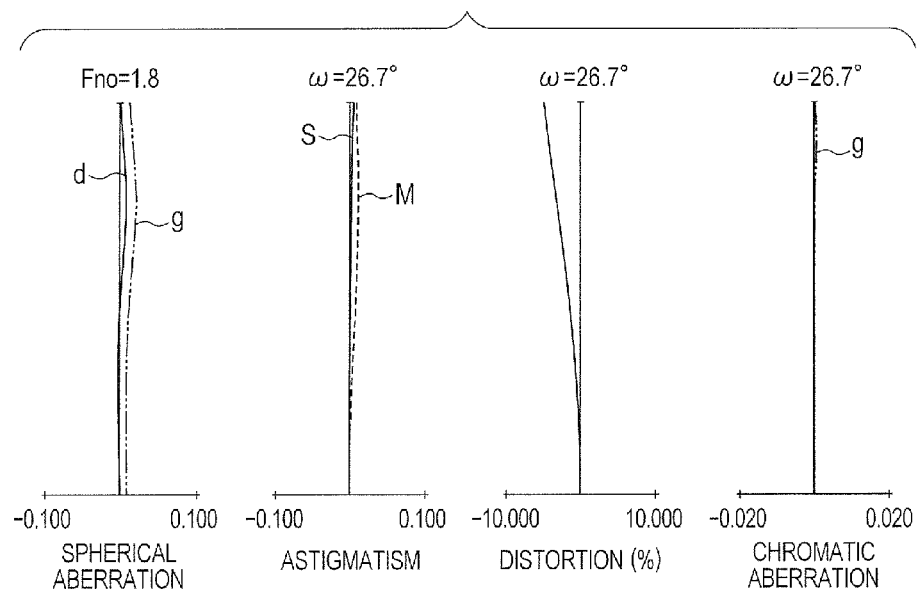
FIG. 6A is aberration diagrams of the zoom lens of Example 3 at the wide angle end.
Figure 6B:
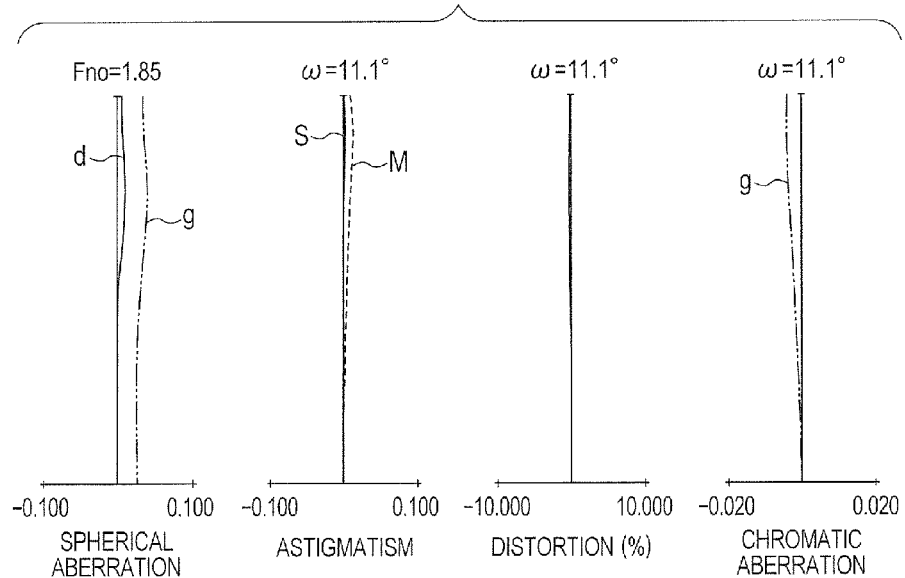
FIG. 6B is aberration diagrams of the zoom lens of Example 3 at the intermediate zoom position.
Figure 6C:
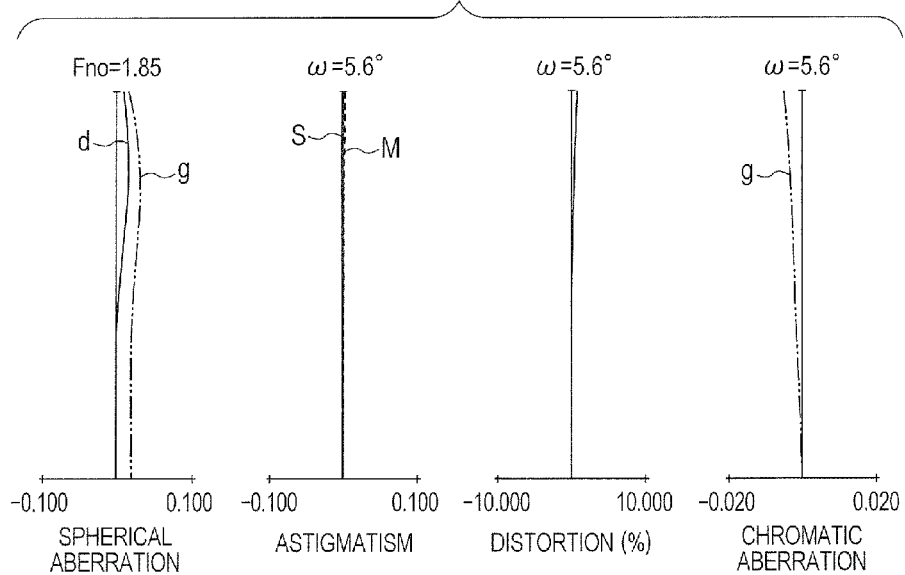
FIG. 6C is aberration diagrams of the zoom lens of Example 3 at the telephoto end.
Figure 7:
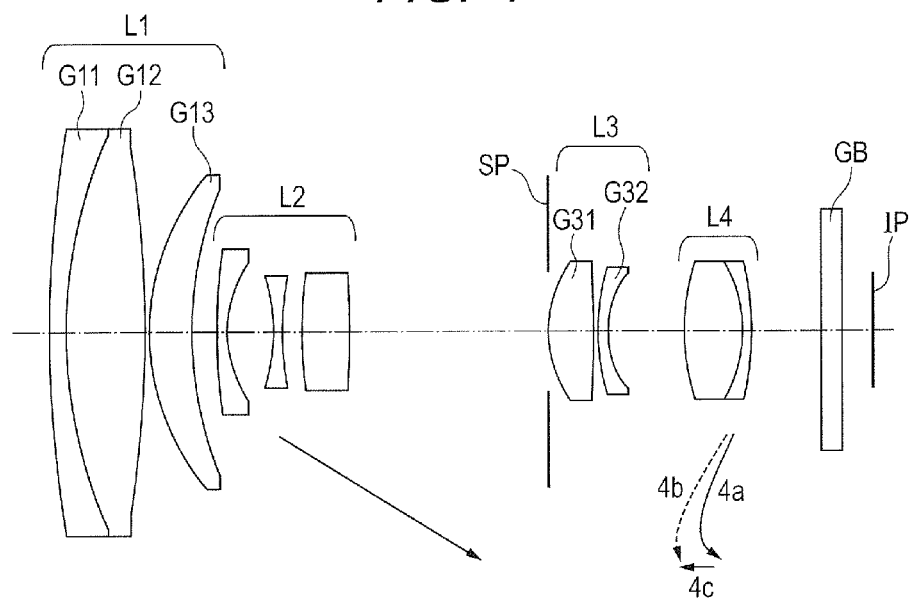
FIG. 7 is a lens cross-sectional view of a zoom lens according to Example 4 of the present invention.
Figure 8A:
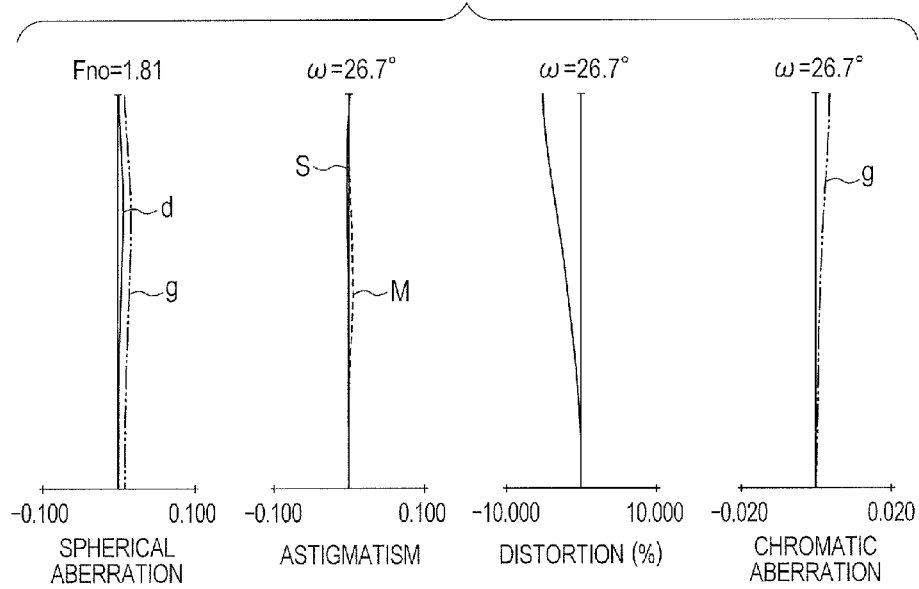
FIG. 8A is aberration diagrams of the zoom lens of Example 4 at the wide angle end.
Figure 8B:
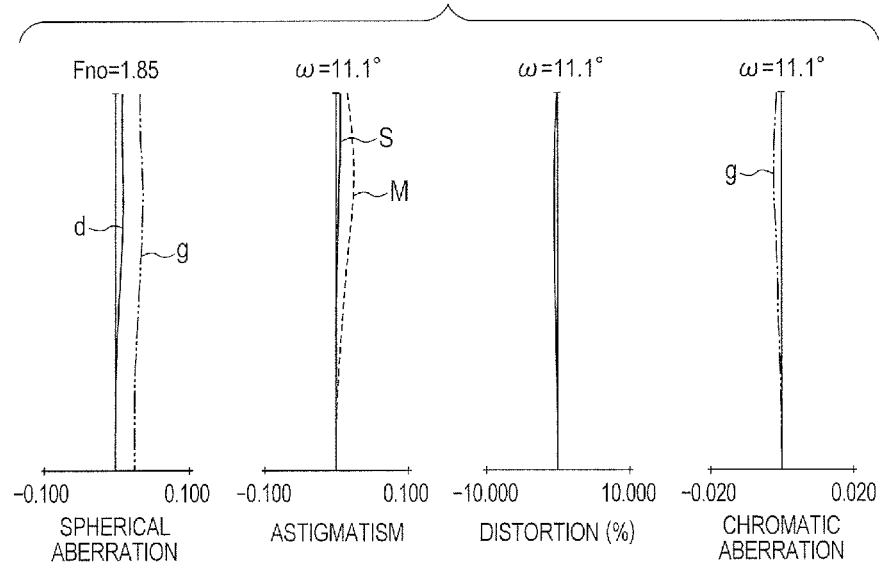
FIG. 8B is aberration diagrams of the zoom lens of Example 4 at the intermediate zoom position.
Figure 8C:
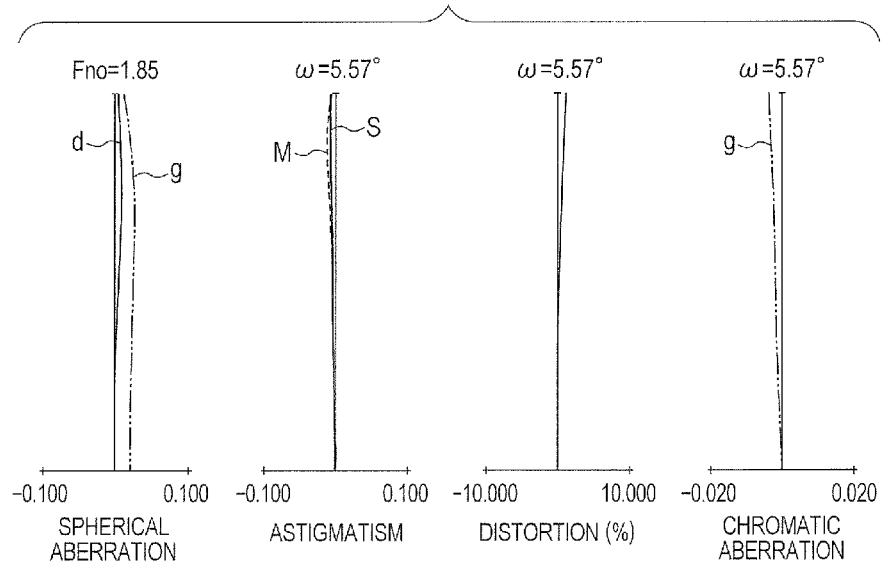
FIG. 8C is aberration diagrams of the zoom lens of Example 4 at the telephoto end.

FIG. 5 is a lens cross-sectional view of a zoom lens according to Example 3 of the present invention at the wide angle end. FIG. 6A, FIG. 6B, and FIG. 6C are aberration diagrams of the zoom lens of Example 3 at the wide angle end, the intermediate zoom position, and the telephoto end, respectively. The zoom lens of Example 3 has a zoom ratio of 4.85 and an F-number of from 1.80 to 1.85. FIG. 7 is a lens cross-sectional view of a zoom lens according to Example 4 of the present invention at the wide angle end. FIG. 8A, FIG. 8B, and FIG. 8C are aberration diagrams of the zoom lens of Example 4 at the wide angle end, the intermediate zoom position, and the telephoto end, respectively. The zoom lens of Example 4 has a zoom ratio of 4.85 and an F-number of from 1.81 to 1.85.

Figure 9:
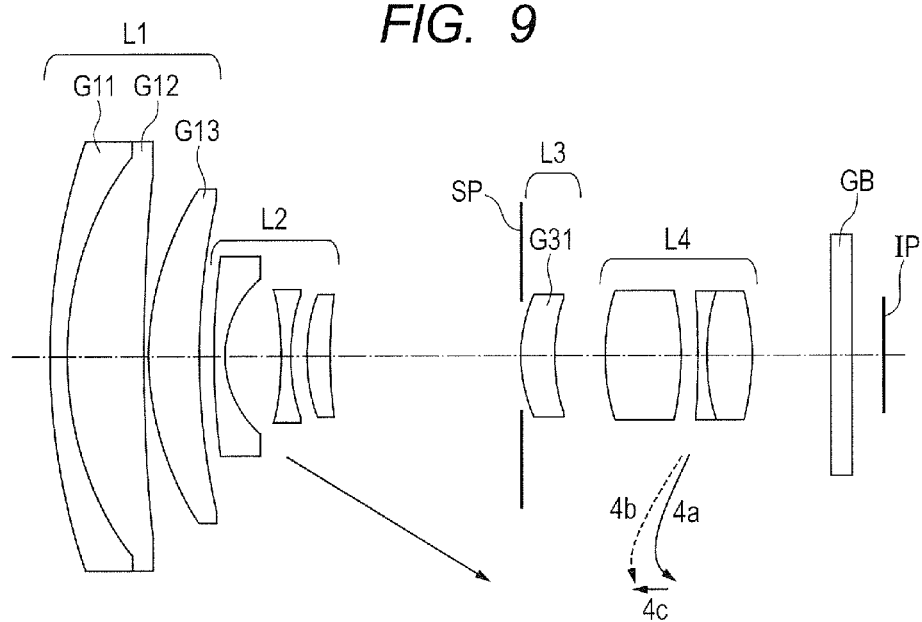
FIG. 9 is a lens cross-sectional view of a zoom lens according to Example 5 of the present invention.
Figure 10A:
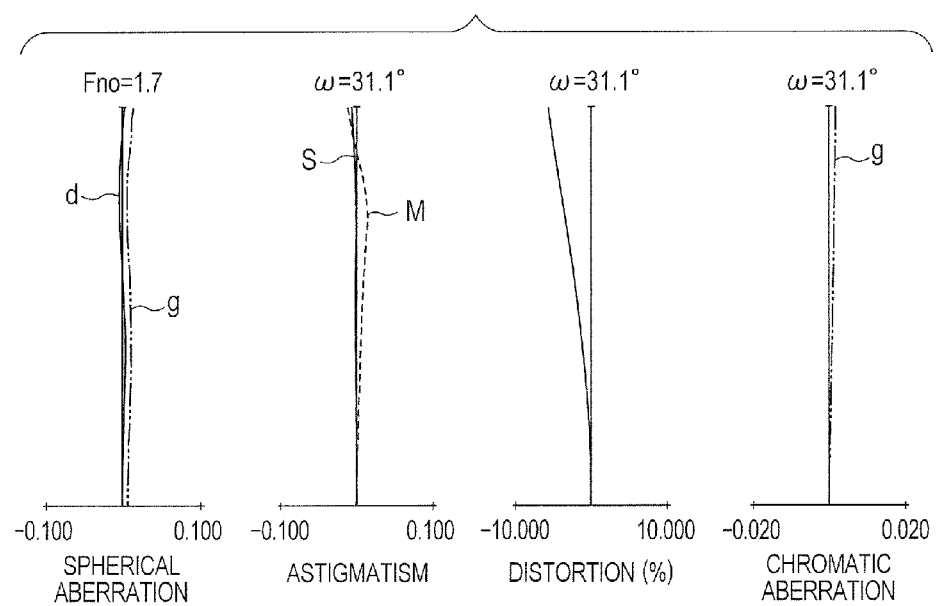
FIG. 10A is aberration diagrams of the zoom lens of Example 5 at the wide angle end.
Figure 10B:
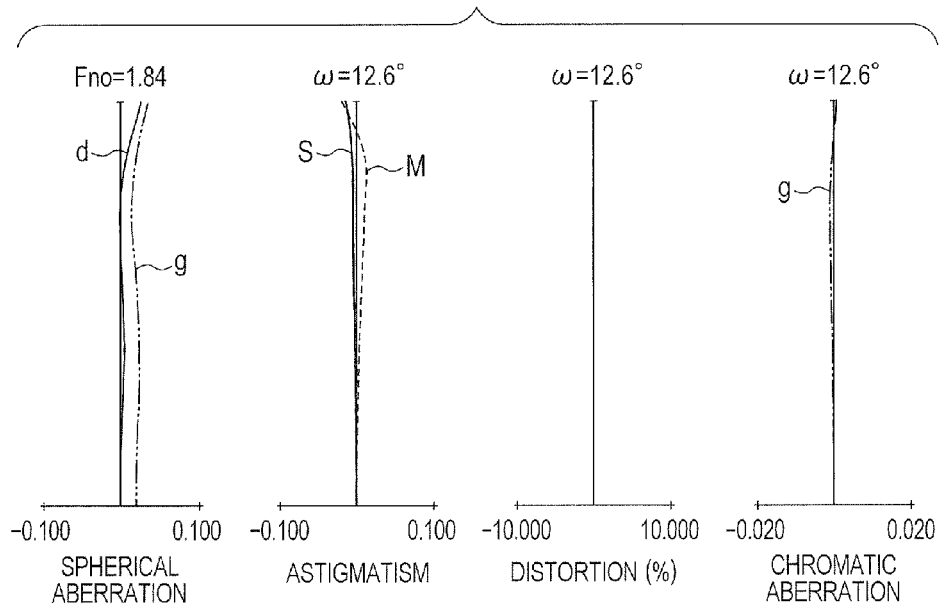
FIG. 10B is aberration diagrams of the zoom lens of Example 5 at the intermediate zoom position.
Figure 10C:
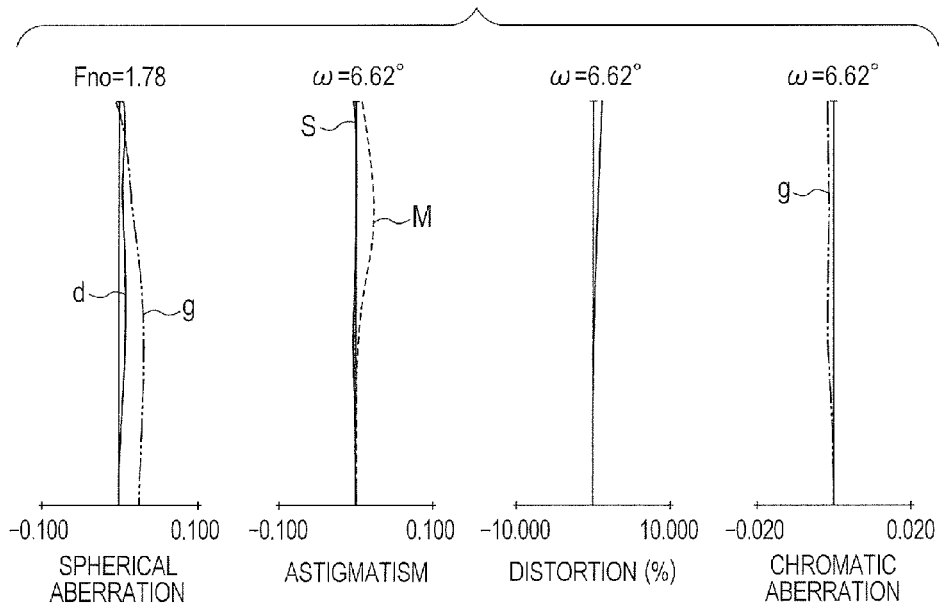
FIG. 10C is aberration diagrams of the zoom lens of Example 5 at the telephoto end.
Figure 11:
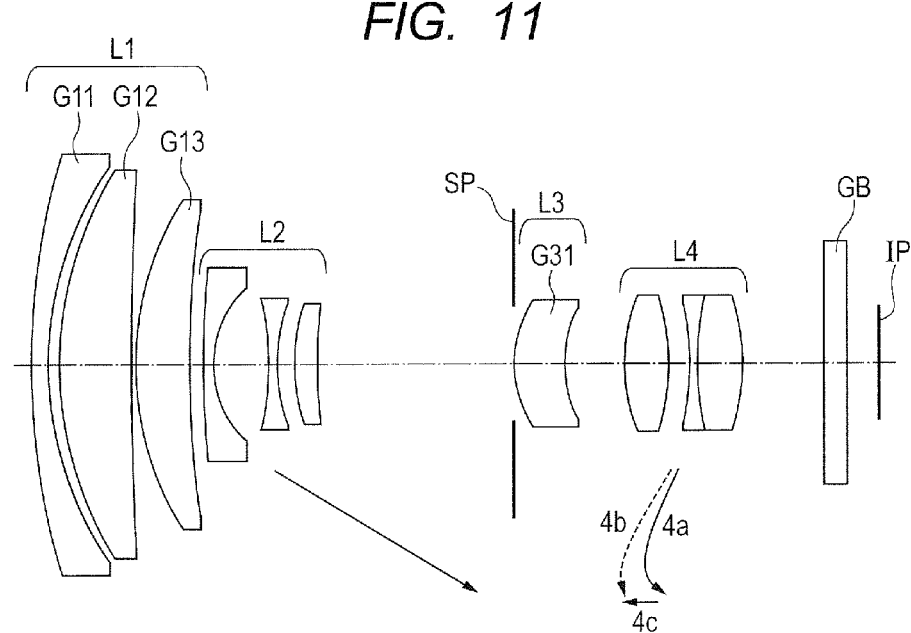
FIG. 11 is a lens cross-sectional view of a zoom lens according to Example 6 of the present invention.
Figure 12A:
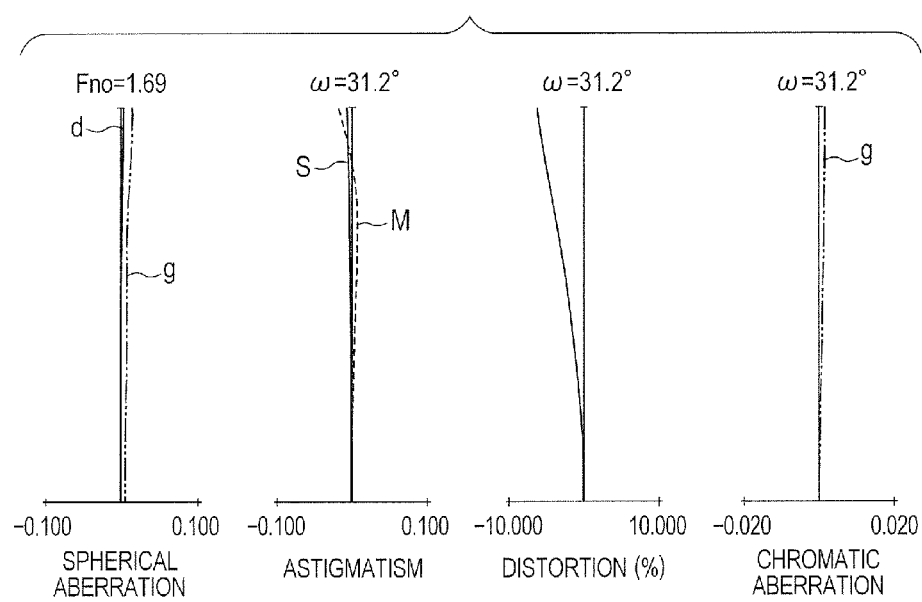
FIG. 12A is aberration diagrams of the zoom lens of Example 6 at the wide angle end.
Figure 12B:
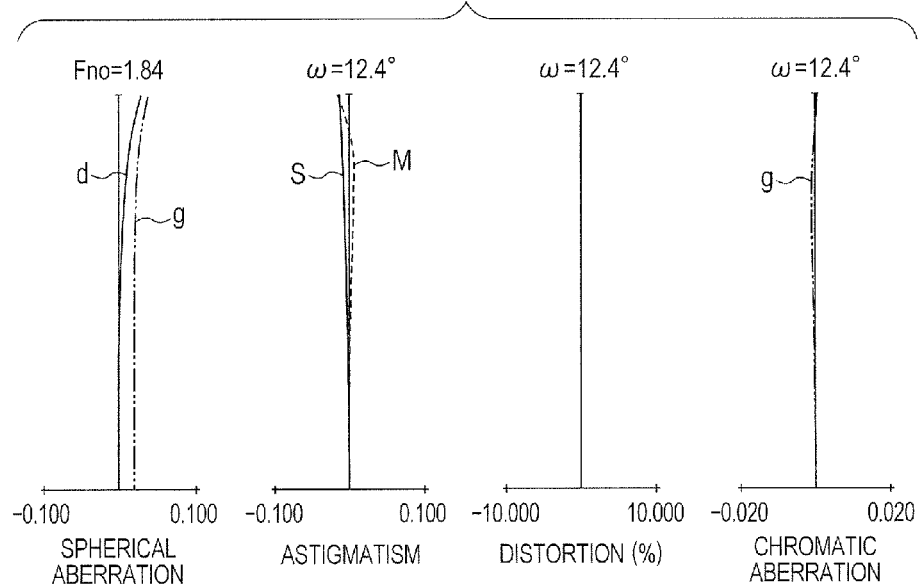
FIG. 12B is aberration diagrams of the zoom lens of Example 6 at the intermediate zoom position.
Figure 12C:
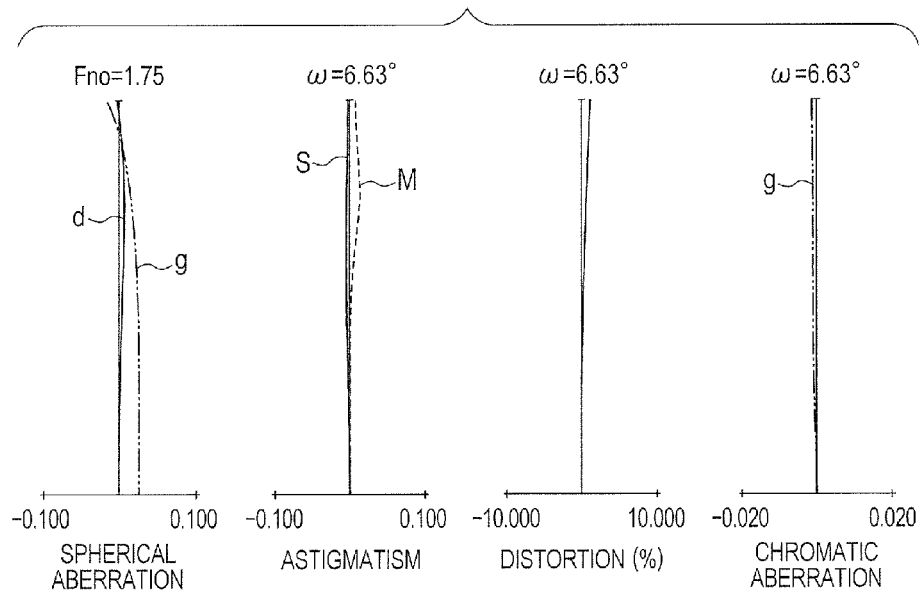
FIG. 12C is aberration diagrams of the zoom lens of Example 6 at the telephoto end.

FIG. 9 is a lens cross-sectional view of a zoom lens according to Example 5 of the present invention at the wide angle end. FIG. 10A, FIG. 10B, and FIG. 10C are aberration diagrams of the zoom lens of Example 5 at the wide angle end, the intermediate zoom position, and the telephoto end, respectively. The zoom lens of Example 5 has a zoom ratio of 4.85 and an F-number of from 1.70 to 1.84. FIG. 11 is a lens cross-sectional view of a zoom lens according to Example 6 of the present invention at the wide angle end. FIG. 12A, FIG. 12B, and FIG. 12C are aberration diagrams of the zoom lens of Example 6 at the wide angle end, the intermediate zoom position, and the telephoto end, respectively. The zoom lens of Example 6 has a zoom ratio of 4.85 and an F-number of from 1.69 to 1.84.

Figure 15:
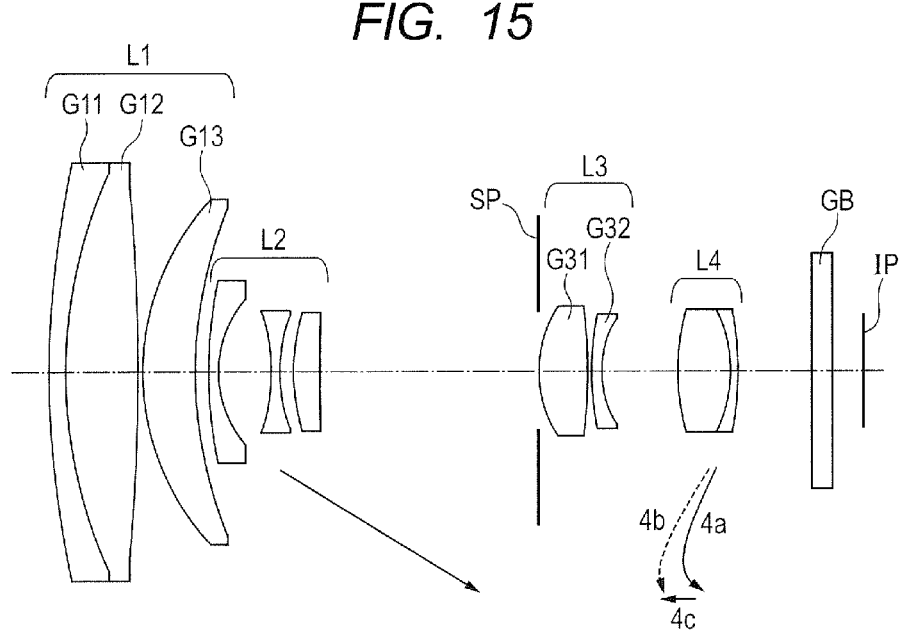
FIG. 15 is a lens cross-sectional view of a zoom lens according to Example 8 of the present invention.
Figure 16A:
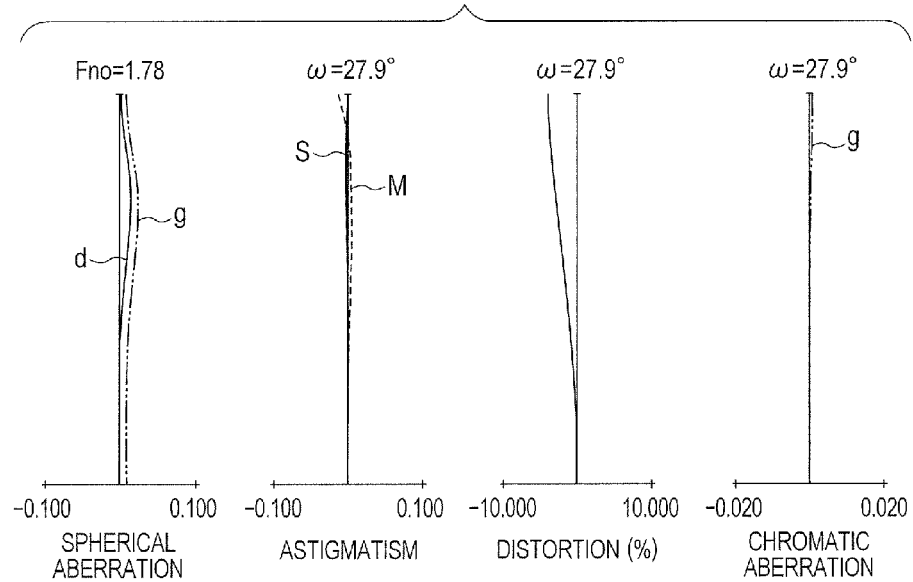
FIG. 16A is aberration diagrams of the zoom lens of Example 8 at the wide angle end.
Figure 16B:
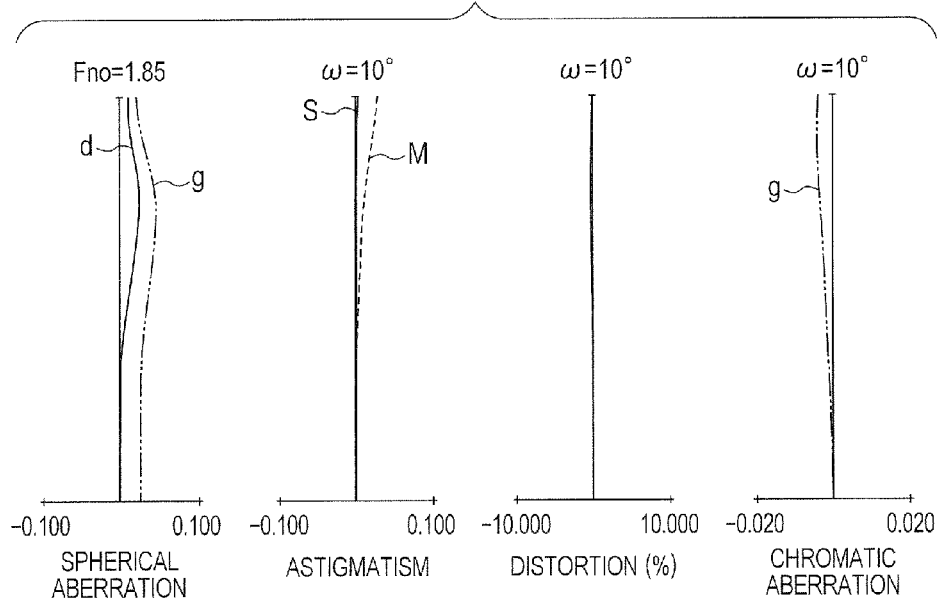
FIG. 16B is aberration diagrams of the zoom lens of Example 8 at the intermediate zoom position.
Figure 16C:
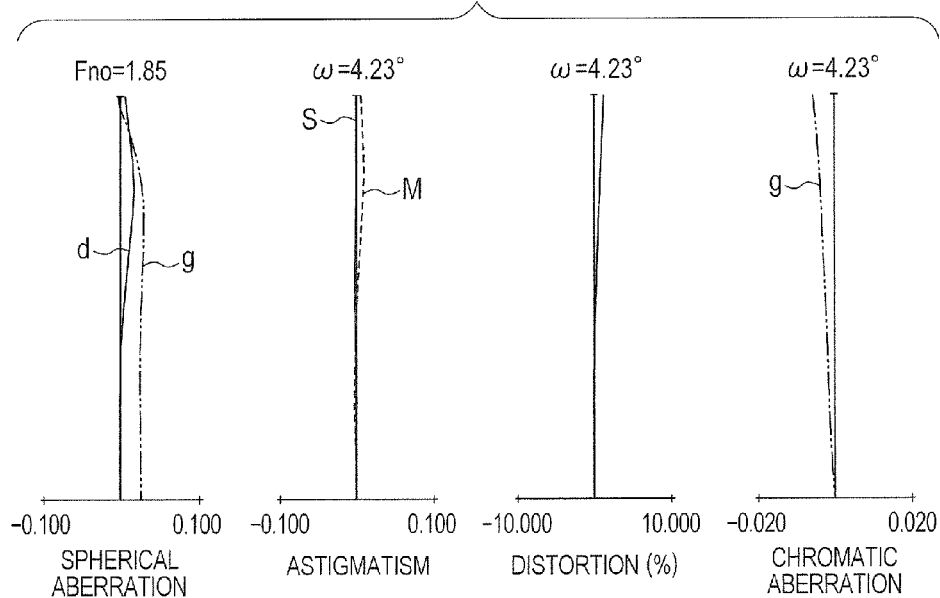
FIG. 16C is aberration diagrams of the zoom lens of Example 8 at the telephoto end.

FIG. 13 is a lens cross-sectional view of a zoom lens according to Example 7 of the present invention at the wide angle end. FIG. 14A, FIG. 14B, and FIG. 14C are aberration diagrams of the zoom lens of Example 7 at the wide angle end, the intermediate zoom position, and the telephoto end, respectively. The zoom lens of Example 7 has a zoom ratio of 5.82 and an F-number of from 1.78 to 1.85. FIG. 15 is a lens cross-sectional view of a zoom lens according to Example 8 of the present invention at the wide angle end. FIG. 16A, FIG. 16B, and FIG. 16C are aberration diagrams of the zoom lens of Example 8 at the wide angle end, the intermediate zoom position, and the telephoto end, respectively. The zoom lens of Example 8 has a zoom ratio of 6.80 and an F-number of from 1.78 to 1.85.

Figure 17:
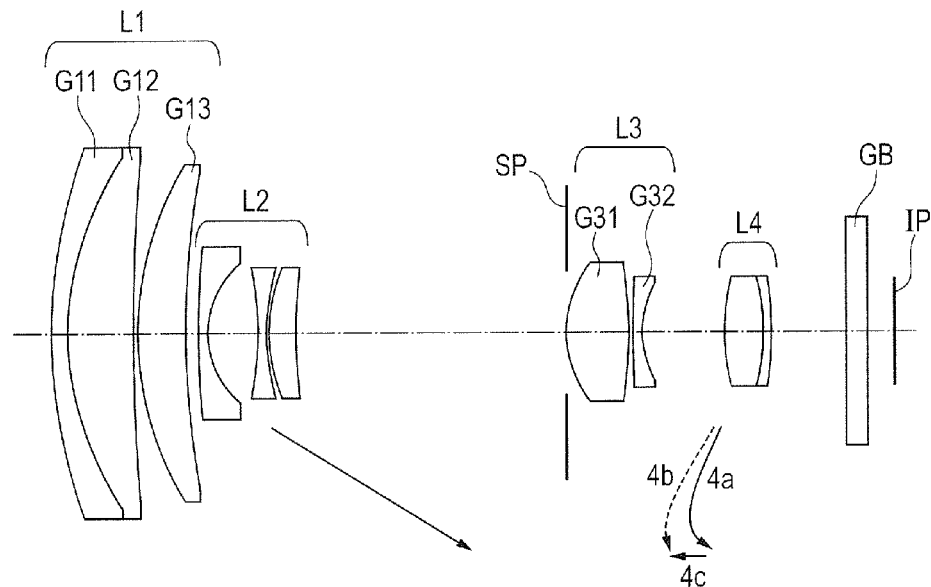
FIG. 17 is a lens cross-sectional view of a zoom lens according to Example 9 of the present invention.
Figure 18A:
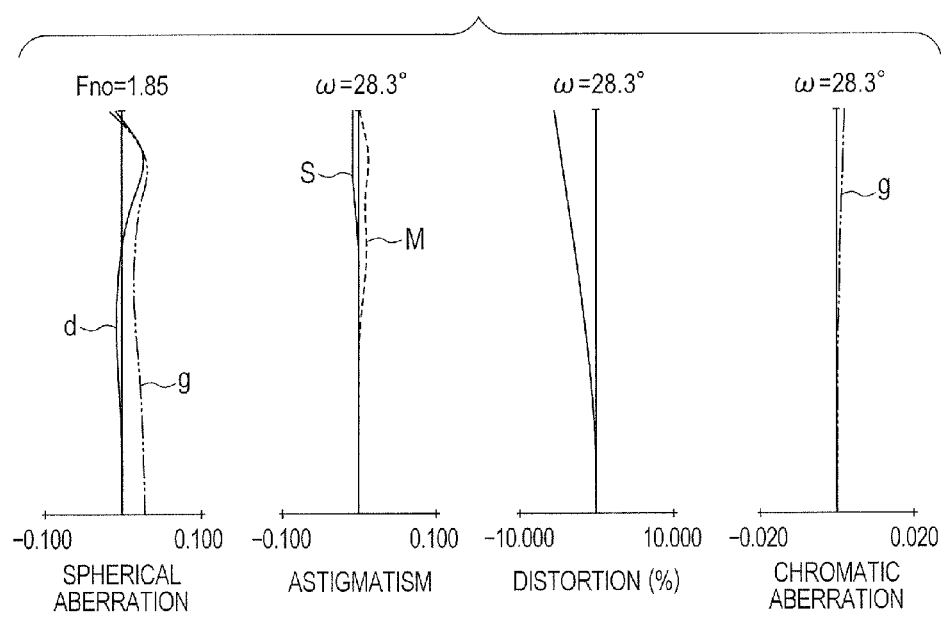
FIG. 18A is aberration diagrams of the zoom lens of Example 9 at the wide angle end.
Figure 18B:
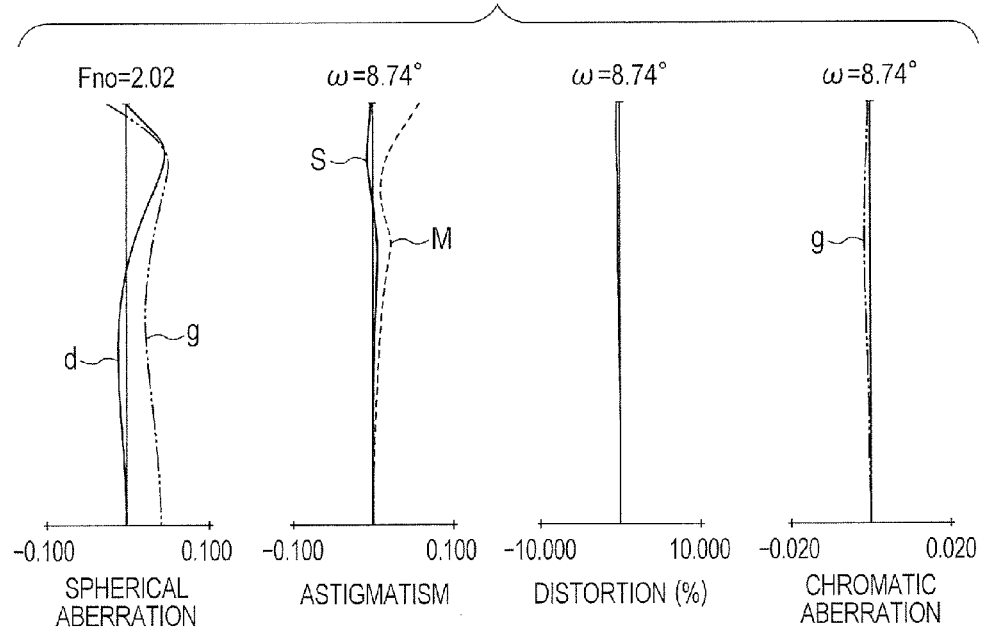
FIG. 18B is aberration diagrams of the zoom lens of Example 9 at the intermediate zoom position.
Figure 18C:
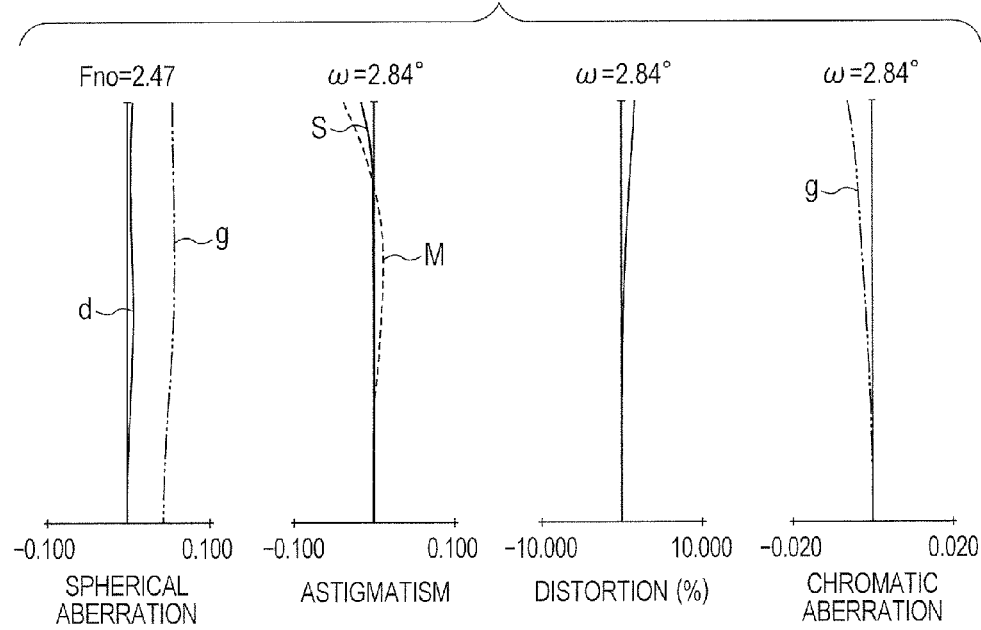
FIG. 18C is aberration diagrams of the zoom lens of Example 9 at the telephoto end.
Figure 19:
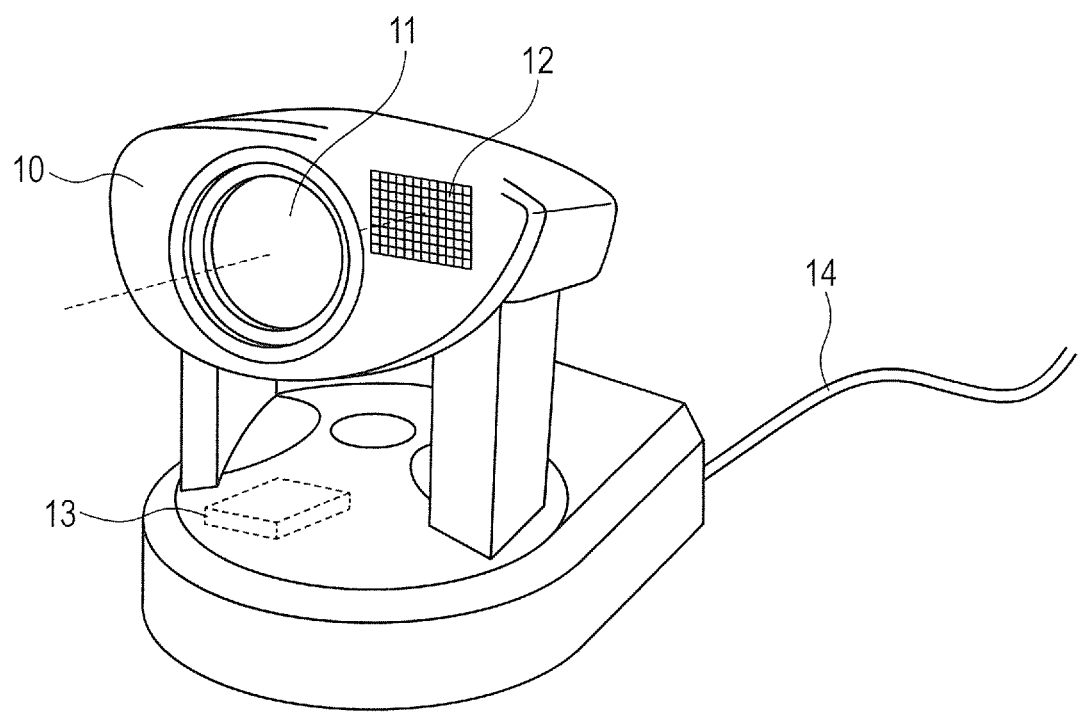
FIG. 19 is an apparatus view of an optical instrument (monitoring camera) including a zoom lens according to the present invention.

FIG. 17 is a lens cross-sectional view of a zoom lens according to Example 9 of the present invention at the wide angle end. FIG. 18A, FIG. 18B, and FIG. 18C are aberration diagrams of the zoom lens of Example 9 at the wide angle end, the intermediate zoom position, and the telephoto end, respectively. The zoom lens of Example 9 has a zoom ratio of 10.10 and an F-number of from 1.85 to 2.47. FIG. 19 is a schematic view of a main part of a monitoring camera (image pickup apparatus) including the zoom lens according to the present invention.

The zoom lens according to each of Example 1 to Example 9 is an image pickup optical system for use with the image pickup apparatus. In the lens cross-sectional views, the left side is the object side, and the right side is the image side. The zoom lens includes a first lens unit L1 having a positive refractive power, a second lens unit L2 having a negative refractive power, a third lens unit L3 having a positive refractive power, and a fourth lens unit L4 having a positive refractive power.

An aperture stop SP is located at the object side of the third lens unit L3. A glass optical block GB corresponds to an optical filter, a face plate, or the like. An image plane IP corresponds to an element surface of a solid-state image pickup element, e.g., a CCD sensor or a CMOS sensor when the zoom lens is used as a photographing optical system of a digital still camera or a video camera, and corresponds to a film surface when the zoom lens is used as an image pickup optical system of a silver-halide film camera.

In spherical aberration diagrams, a d-line (wavelength: 587.6 nm) is represented by d, and a g-line (wavelength: 435.8 nm) is represented by g. In astigmatism diagrams, a meridional image plane and a sagittal image plane with respect to the d-line are represented by M and S, respectively. In distortion, the d-line is shown. In a lateral chromatic aberration, an aberration of the g-line with respect to the d-line is shown. An F-number is represented by Fno and a half angle of view (degree) is represented by ω. In each of the following Examples, the wide angle end and the telephoto end mean zoom positions when the second lens unit L2 being a variable magnification lens unit is located at one end and the other end of a range in which the second lens unit L2 is mechanically movable on an optical axis, respectively.

During zooming from the wide angle end to the telephoto end, as indicated by the arrow, the second lens unit L2 is configured to move from the object side toward the image side. The fourth lens unit L4 is configured to move along a locus convex to the object side so as to correct image plane variation due to varying magnification. Further, the fourth lens unit L4 is configured to move on the optical axis for focusing.

A solid curve 4a and a dotted curve 4b regarding the fourth lens unit L4 are movement loci for correcting image plane variation due to varying magnification when focusing at an object at infinity and an object at the short distance, respectively. The fourth lens unit L4 is configured to move with the locus convex to the object side during zooming from the wide angle end to the telephoto end so that a space on the image side of the third lens unit L3 may be effectively used. Consequently, the total lens length can be effectively reduced. Moreover, when focusing from the object at infinity to the object at short distance is performed at the telephoto end, the focusing is performed by moving the fourth lens unit L4 toward the object side as indicated by an arrow 4c.

The first lens unit L1 configured not to move during focusing and zooming may be configured to move if needed for aberration correction. Further, all or part of lenses of the third lens unit L3 may be moved with a component in a direction perpendicular to the optical axis so as to correct a blur of images (image blur), which are taken while the zoom lens is being shaken.

In the zoom lens of each Example, each element is specified as follows in order to obtain a bright zoom lens having a large aperture ratio and high optical characteristics while being small as a whole. In order to obtain the high zoom ratio while reducing the total lens length, the refractive power of the first lens unit L1, which is closest to the object side in the entire system, and the refractive power of the second lens unit L2, which is configured to move on the optical axis during zooming as a main magnification-varying lens unit, are important factors.

Further, as the aperture ratio is increased, the diameter of light fluxes entering a front lens of the zoom lens is increased. In order to suitably correct a spherical aberration and an axial chromatic aberration at the telephoto end, it is important to appropriately set the lens configuration of the first lens unit L1. Accordingly, in each Example, the first lens unit L1 consists of, in order from the object side to the image side, a negative lens G11, a positive lens G12, and a positive lens G13.

In Examples 1 to 5 and 7 to 9, the first lens unit L1 consists of, in order from the object side to the image side, a cemented lens obtained by cementing a negative meniscus lens G11 having a convex surface facing the object side and a positive lens G12 having a convex surface facing the object side, and a positive meniscus lens G13 having a convex surface facing the object side. In Example 6, the first lens unit L1 consists of, in order from the object side to the image side, a negative meniscus lens G11 having a convex surface facing the object side, a positive lens G12 having a convex surface facing the object side, and a negative meniscus lens G13 having a convex surface facing the object side. With those lens configurations, a spherical aberration and a field curvature are suitably corrected at the telephoto end while the entire system is small.

In addition, an Abbe number of a material of the negative lens G11 in the first lens unit L1 is represented by $\nu 1n$, the average value of refractive indices of materials of three lenses in the first lens unit L1 is represented by N1ave, a focal length of the first lens unit L1 is represented by f1, and a focal length of the second lens unit L2 is represented by f2. In this case, the following conditional expressions are satisfied.

$$15.0 < \nu 1n / 22.0 \quad (1)$$

$$1.7 < N1\text{ave} < 2.5 \quad (2)$$

$$2.0 < |f1/f2| < 5.0 \quad (3)$$

Next, the technical meanings of the above-mentioned conditional expressions are described. Conditional Expression (1) is intended to appropriately set the Abbe number of the material of the negative lens G11 in the first lens unit L1. An axial chromatic aberration generated in the first lens unit L1 is suitably corrected with the negative lens G11 in the first lens unit L1. When the value exceeds the upper limit of Conditional Expression (1), an axial chromatic aberration is not sufficiently corrected in the first lens unit L1, and hence it becomes difficult to satisfactorily correct an axial chromatic aberration at the telephoto end. When the value falls below the lower limit of Conditional Expression (1), an axial chromatic aberration is excessively corrected, and hence it becomes difficult to suitably correct variations of an axial chromatic aberration and a lateral chromatic aberration during zooming from the wide angle end to the telephoto end.

Conditional Expression (2) is intended to appropriately set the average value of the refractive indices of the materials of the three lenses in the first lens unit L1. When the value exceeds the upper limit of Conditional Expression (2), the curvatures of the lens surfaces of the lenses arranged in the first lens unit L1 become further weaker, and hence it becomes difficult to correct a spherical aberration at the telephoto end. When the value falls below the lower limit of Conditional Expression (2), the curvatures of the lens surfaces of the lenses arranged in the first lens unit L1 become further stronger, and hence it becomes difficult to correct a field curvature and astigmatism at the telephoto end.

Conditional Expression (3) is intended to appropriately set the ratio of the focal length of the first lens unit L1 to the focal length of the second lens unit L2. When the value exceeds the upper limit of Conditional Expression (3), the positive refractive power of the first lens unit L1 becomes further weaker, and hence the total lens length is increased. When the value falls below the lower limit of Conditional Expression (3), the positive refractive power of the first lens unit L1 becomes further stronger, and hence it becomes difficult to correct a field curvature and a coma at the telephoto end. In addition, the negative refractive power of the second lens unit L2 becomes further weaker (the absolute value of the negative refractive power is reduced), and hence a movement amount of the second lens unit L2 required for zooming from the wide angle end to telephoto end is increased, resulting in an increase in total lens length.

In each Example, it is preferred to set the numerical ranges of Conditional Expressions (1), (2), and (3) as follows.

$$16.0 < \nu 1n < 20.0 \quad (1a)$$

$$1.75 < N1\text{ave} < 2.20 \quad (2a)$$

$$3.0 < |f1/f2| < 4.8 \quad (3a)$$

It is more preferred to set the numerical ranges of Conditional Expressions (1a), (2a), and (3a) as follows.

$$17.0 < \nu 1n < 19.0 \quad (1b)$$

$$1.80 < N1\text{ave} < 2.10 \quad (2b)$$

$$3.5 < |f1/f2| < 4.6 \quad (3b)$$

In each Example, the above-mentioned configuration is employed to obtain a zoom lens having a large aperture ratio and high optical characteristics over the entire zoom range while being small as a whole. Further, in order to obtain a zoom lens having a large aperture ratio and high optical characteristics over the entire zoom range while being small as a whole, it is desired to satisfy at least one of the following conditional expressions. A focal length of the entire system at the wide angle end is represented by fw, a focal length of the fourth lens unit L4 is represented by f4, and a distance from a lens surface of the first lens unit L1 that is closest to the object side to a lens surface of the first lens unit L1 that is closest to the image side is represented by D1. In this case, it is preferred to satisfy at least one of the following conditional expressions.

$$3.0 < f1/fw < 7.0 \quad (4)$$

$$1.0 < f1/f4 < 4.0 \quad (5)$$

$$1.0 < |f4/f2| < 3.0 \quad (6)$$

$$0.7 < |f2/fw| < 2.0 \quad (7)$$

$$2.0 < f1/D1 < 5.0 \quad (8)$$

Next, the technical meanings of the above-mentioned conditional expressions are described. Conditional Expression (4) is intended to appropriately set the ratio of the focal length of the first lens unit L1 to the focal length of the entire system at the wide angle end. When the ratio exceeds the upper limit of Conditional Expression (4), and the positive refractive power of the first lens unit L1 becomes further weaker, the total lens length is increased. When the ratio falls below the lower limit of Conditional Expression (4), and the positive refractive power of the first lens unit L1 becomes further stronger, it becomes difficult to correct a spherical aberration and a coma at the telephoto end.

Conditional Expression (5) is intended to appropriately set the ratio of the focal length of the first lens unit L1 to the focal length of the fourth lens unit L4. When the ratio exceeds the upper limit of Conditional Expression (5), and the positive refractive power of the fourth lens unit L4 becomes further stronger, a field curvature and a coma are generated by a large amount, and it becomes difficult to correct variations of those various aberrations during zooming. When the ratio falls below the lower limit of Conditional Expression (5), and the positive refractive power of the first lens unit L1 becomes further stronger, it becomes difficult to correct a spherical aberration and a coma at the telephoto end.

Conditional Expression (6) is intended to appropriately set the ratio of the focal length of the second lens unit L2 to the focal length of the fourth lens unit L4. When the ratio exceeds the upper limit of Conditional Expression (6), and the negative refractive power of the second lens unit L2 becomes further stronger (the absolute value of the negative refractive power is increased), a field curvature and a chromatic aberration are generated by a large amount, and it becomes difficult to correct variations of those various aberrations during zooming. When the ratio falls below the lower limit of Conditional Expression (6), and the positive refractive power of the fourth lens unit L4 becomes further stronger, a field curvature and a coma are generated by a large amount, and it becomes difficult to correct variations of those various aberrations during zooming.

In addition, when the negative refractive power of the second lens unit L2 becomes further weaker (the absolute value of the negative refractive power is reduced), the movement amount of the second lens unit L2 during zooming from the wide angle end to the telephoto end is increased, resulting in an increase in total lens length.

Conditional Expression (7) is intended to appropriately set the ratio of the focal length of the second lens unit L2 to the focal length of the entire system at the wide angle end. When the ratio exceeds the upper limit of Conditional Expression (7), and the negative refractive power of the second lens unit L2 becomes further weaker, the total lens length is increased. When the ratio falls below the lower limit of Conditional Expression (7), and the negative refractive power of the second lens unit L2 becomes further stronger, a field curvature and a chromatic aberration are generated by a large amount, and it becomes difficult to correct variations of those various aberrations during zooming.

Conditional Expression (8) is intended to appropriately set the ratio of the focal length of the first lens unit L1 to the distance from the lens surface of the first lens unit L1 that is closest to the object side to the lens surface of the first lens unit L1 that is closest to the image side. When the ratio exceeds the upper limit of Conditional Expression (8), and the positive refractive power of the first lens unit L1 becomes further weaker, the total lens length is increased. When the ratio falls below the lower limit of Conditional Expression (8), and the positive refractive power of the first lens unit L1 becomes further stronger, it becomes difficult to correct a spherical aberration and a coma at the telephoto end. In addition, the distance from the lens surface of the first lens unit L1 that is closest to the object side to the lens surface of the first lens unit L1 that is closest to the image side is further increased, resulting in an increase in total lens length.

In each Example, for the purpose of correcting the aberrations, it is more preferred to set the numerical ranges of Conditional Expressions (4) to (8) as follows.

$$4.0 < f1/fw < 6.5 \quad (4a)$$

$$1.5 < f1/f4 < 3.4 \quad (5a)$$

$$1.2 < |f4/f2| < 2.5 \quad (6a)$$

$$0.9 < |f2/fw| < 1.6 \quad (7a)$$

$$2.2 < f1/D1 < 4.0 \quad (8a)$$

It is still more preferred to set the numerical ranges of Conditional Expressions (4a) to (8a) as follows.

$$4.5 < f1/fw < 6.0 \quad (4b)$$

$$1.8 < f1/f4 < 2.8 \quad (5b)$$

$$1.5 < |f4/f2| < 2.2 \quad (6b)$$

$$1.1 < |f2/fw| < 1.4 \quad (7b)$$

$$2.5 < f1/D1 < 3.6 \quad (8b)$$

In each Example, the above-mentioned configuration is employed to obtain a bright zoom lens having a large aperture ratio and high optical characteristics over the entire zoom range while being small as a whole. In each Example, it is more preferred that each lens unit have the following lens configuration. First, it is preferred that the third lens unit L3 include a positive lens and a negative lens, or include one positive lens. With such a lens configuration, the number of lenses forming the third lens unit L3 may be minimum required, which facilitates reduction in total lens length.

In Examples 1 to 4 and 7 to 9, the third lens unit L3 consists of a positive lens G31 having a convex surface facing the object side, and a negative lens G32 having a concave surface facing the image side. In Examples 5 and 6, the third lens unit L3 consists of a positive meniscus lens G31 having a convex surface facing the object side. Further, it is preferred that at least one lens surface of the positive lens G31 in the third lens unit L3 have an aspherical shape, which facilitates satisfactory correction of a spherical aberration and a coma at the wide angle end.

Further, it is preferred that the aperture stop SP be arranged between the second lens unit L2 and the third lens unit L3, or inside the third lens unit L3. With such an arrangement, it is easy to appropriately set a distance from the front lens to the aperture stop SP, to thereby prevent an effective diameter of the front lens from being excessively increased. Further, it is preferred that the aperture stop SP be configured not to move during zooming. With this, it is easy to simplify the apparatus configuration of the entire optical system and to downsize the apparatus as a whole.

Further, it is preferred that the second lens unit L2 consist of, in order from the object side to the image side, a negative lens, a negative lens, and a positive lens. Specifically, it is preferred that the second lens unit L2 consist of a negative lens having a concave surface facing the image side and a stronger curvature on the image side than on the object side, a negative biconcave lens, and a positive lens having a convex surface facing the object side.

With such a lens configuration, it is easy to appropriately correct variations of a field curvature and a coma during zooming from the wide angle end to the telephoto end. Further, it is preferred that the fourth lens unit L4 include at least one positive lens and at least one negative lens. With such a lens configuration, the number of lenses forming the fourth lens unit L4 may be minimum required, which facilitates reduction in total lens length.

In Examples 1 to 4 and 7 to 9, the fourth lens unit L4 consists only of a cemented lens obtained by cementing a positive lens and a negative lens, and has at least one lens surface with an aspherical shape. In Examples 5 and 6, the fourth lens unit L4 consists of, in order from the object side to the image side, a positive lens having a surface with an aspherical shape, and a cemented lens obtained by cementing a negative lens and a positive lens.

Now, Numerical Data 1 to 9 are described, which correspond to Examples 1 to 9 of the present invention, respectively. In each of Numerical Data, symbol ri represents a radius of curvature of an i-th surface in order from the object side, symbol di represents a distance between an i-th surface and an (i+1)th surface, and symbols ndi and vdi represent a refractive index and an Abbe number of a material of a lens between the i-th surface and the (i+1)th surface, respectively. In addition, in each of Numerical Data 1 to 9, two surfaces closest to the image side are flat surfaces corresponding to a glass block. An aspherical shape is expressed by the expression below, where an X axis corresponds to the optical axis direction, an h axis corresponds to a direction perpendicular to the optical axis, a light propagation direction is positive, symbol R represents a paraxial curvature radius, symbol k represents a conic constant, and symbols A4, A6, A8, and A10 represent aspherical coefficients, respectively.

$$X = \frac{(1/R)h^2}{1+\sqrt{1-(1+k)(h/R)^2}} + A4h^4 + A6H^6 + A8h^8 + A10h^{10}$$

* means a surface having an aspherical shape. For example, the description of [e-x] means "$10^{-x}$". Symbol BF is back focus, which is represented by an air-converted length from a final lens surface to an image plane. The total lens length is a value obtained by adding the value of the back focus BF to a distance from the first lens surface to the final lens surface. The relationships between the above-mentioned conditional expressions and various numerical values in Numerical Examples are shown in Table 1.

[Numerical data 1]
Unit mm

Surface data

| Surface number | r | d | nd | vd |
|---|---|---|---|---|
| 1 | 63.353 | 0.60 | 1.95906 | 17.5 |
| 2 | 19.639 | 2.98 | 1.77250 | 49.6 |
| 3 | −54.834 | 0.15 | | |
| 4 | 10.377 | 1.71 | 1.91082 | 35.3 |
| 5 | 18.634 | (Variable) | | |
| 6 | 30.803 | 0.35 | 1.91082 | 35.3 |
| 7 | 4.155 | 1.95 | | |
| 8 | −6.528 | 0.30 | 1.80400 | 46.6 |
| 9 | 13.260 | 0.75 | | |
| 10 | 16.748 | 1.12 | 1.95906 | 17.5 |
| 11 | −23.500 | (Variable) | | |
| 12 (Stop) | ∞ | 0.00 | | |
| 13* | 3.925 | 1.56 | 1.76802 | 49.2 |
| 14* | −15.383 | 0.15 | | |
| 15 | 10.215 | 0.35 | 1.85478 | 24.8 |
| 16 | 3.474 | (Variable) | | |
| 17* | 8.435 | 2.11 | 1.76802 | 49.2 |
| 18 | −4.410 | 0.30 | 1.95906 | 17.5 |
| 19 | −10.040 | (Variable) | | |
| 20 | ∞ | 0.80 | 1.51000 | 60.0 |
| 21 | ∞ | 1.10 | | |

Aspherical surface data

Thirteenth surface

K = 0.00000e+000  A4 = −1.61689e−003  A6 = −1.05853e−004
A8 = 1.31876e−005  A10 = −1.52375e−006

Fourteenth surface

K = 0.00000e+000  A4 = 1.58816e−003  A6 = −4.35039e−005

Seventeenth surface

K = 0.00000e+000  A4 = −6.18176e−004  A6 = 7.13098e−005
A8 = −2.67476e−005  A10 = 1.87492e−006

Zoom ratio 4.85

| | Wide angle | Intermediate | Telephoto |
|---|---|---|---|
| Focal length | 2.77 | 6.71 | 13.44 |
| F-number | 1.81 | 1.85 | 1.85 |
| Half angle of field (degree) | 29.62 | 13.20 | 6.69 |
| Image height | 1.58 | 1.58 | 1.58 |
| Total lens length | 29.46 | 29.46 | 29.46 |
| BF | 3.63 | 4.43 | 4.19 |
| d5 | 0.67 | 5.25 | 7.83 |
| d11 | 7.91 | 3.33 | 0.75 |
| d16 | 2.87 | 2.07 | 2.31 |
| d19 | 2.00 | 2.80 | 2.56 |

[Numerical data 2]
Unit mm

Surface data

| Surface number | r | d | nd | vd |
|---|---|---|---|---|
| 1 | 77.734 | 0.70 | 1.95906 | 17.5 |
| 2 | 20.253 | 2.25 | 1.77250 | 49.6 |
| 3 | −44.522 | 0.15 | | |
| 4 | 10.096 | 1.50 | 1.91082 | 35.3 |

[Numerical data 2]
Unit mm

| | | | | |
|---|---|---|---|---|
| 5 | 17.216 | (Variable) | | |
| 6 | 23.597 | 0.45 | 1.83481 | 42.7 |
| 7 | 4.505 | 1.95 | | |
| 8 | −6.366 | 0.45 | 1.69680 | 55.5 |
| 9 | 10.182 | 0.73 | | |
| 10 | 12.705 | 0.81 | 1.95906 | 17.5 |
| 11 | −455.829 | (Variable) | | |
| 12 (Stop) | ∞ | 0.00 | | |
| 13* | 4.559 | 1.94 | 1.76802 | 49.2 |
| 14* | −21.988 | 0.15 | | |
| 15 | 10.784 | 0.45 | 1.80809 | 22.8 |
| 16 | 4.101 | (Variable) | | |
| 17* | 8.435 | 1.83 | 1.76802 | 49.2 |
| 18 | −5.764 | 0.45 | 1.95906 | 17.5 |
| 19 | −13.177 | (Variable) | | |
| 20 | ∞ | 0.80 | 1.51000 | 60.0 |
| 21 | ∞ | 1.10 | | |

Aspherical surface data

Thirteenth surface

K = 0.00000e+000    A4 = −1.05005e−003    A6 = −7.31739e−005
A8 = 9.07374e−006    A10 = −7.62482e−007

Fourteenth surface

K = 0.00000e+000    A4 = 8.74540e−004    A6 = −2.69770e−005

Seventeenth surface

K = 0.00000e+000    A4 = −6.97273e−004    A6 = 7.97059e−005
A8 = −2.48511e−005    A10 = 1.76575e−006

Zoom ratio 4.85

| | Wide angle | Intermediate | Telephoto |
|---|---|---|---|
| Focal length | 3.29 | 8.13 | 15.96 |
| F-number | 1.79 | 1.85 | 1.85 |
| Half angle of field (degree) | 25.58 | 10.97 | 5.64 |
| Image height | 1.58 | 1.58 | 1.58 |
| Total lens length | 29.59 | 29.59 | 29.59 |
| BF | 4.39 | 5.32 | 4.85 |
| d5 | 0.63 | 5.21 | 7.79 |
| d11 | 7.87 | 3.29 | 0.71 |
| d16 | 2.88 | 1.95 | 2.43 |
| d19 | 2.76 | 3.69 | 3.22 |

[Numerical data 3]
Unit mm

Surface data

| Surface number | r | d | nd | vd |
|---|---|---|---|---|
| 1 | 59.968 | 0.60 | 1.94595 | 18.0 |
| 2 | 18.627 | 2.48 | 1.83481 | 42.7 |
| 3 | −57.100 | 0.15 | | |
| 4 | 9.550 | 1.67 | 1.83481 | 42.7 |
| 5 | 15.617 | (Variable) | | |
| 6 | 28.005 | 0.35 | 1.91082 | 35.3 |
| 7 | 4.437 | 1.69 | | |
| 8 | −7.354 | 0.30 | 1.77250 | 49.6 |
| 9 | 10.999 | 1.26 | | |
| 10 | 16.647 | 0.94 | 1.95906 | 17.5 |
| 11 | −44.421 | (Variable) | | |
| 12 (Stop) | ∞ | 0.00 | | |
| 13* | 4.059 | 1.94 | 1.69350 | 53.2 |
| 14* | −40.915 | 0.15 | | |
| 15 | 5.687 | 0.35 | 1.80809 | 22.8 |
| 16 | 3.219 | (Variable) | | |
| 17* | 8.435 | 1.68 | 1.76802 | 49.2 |
| 18 | −5.628 | 0.30 | 1.95906 | 17.5 |
| 19 | −15.569 | (Variable) | | |
| 20 | ∞ | 0.80 | 1.51000 | 60.0 |
| 21 | ∞ | 1.10 | | |

Aspherical surface data

Thirteenth surface

K = 0.00000e+000    A4 = −1.38459e−003    A6 = −8.61057e−005
A8 = 6.79582e−006    A10 = −7.65123e−007

Fourteenth surface

K = 0.00000e+000    A4 = 6.44714e−004    A6 = −1.65728e−005

Seventeenth surface

K = 0.00000e+000    A4 = −3.87252e−004    A6 = −5.45593e−006
A8 = 1.73690e−007    A10 = −3.33737e−007

Zoom ratio 4.85

| | Wide angle | Intermediate | Telephoto |
|---|---|---|---|
| Focal length | 3.29 | 8.03 | 15.96 |
| F-number | 1.80 | 1.85 | 1.85 |
| Half angle of field (degree) | 25.58 | 11.10 | 5.64 |
| Image height | 1.58 | 1.58 | 1.58 |
| Total lens length | 29.74 | 29.74 | 29.74 |
| BF | 4.46 | 5.29 | 4.65 |
| d5 | 0.71 | 5.24 | 7.79 |
| d11 | 7.78 | 3.25 | 0.70 |
| d16 | 2.92 | 2.09 | 2.74 |
| d19 | 2.83 | 3.66 | 3.02 |

[Numerical data 4]
Unit mm

Surface data

| Surface number | r | d | nd | vd |
|---|---|---|---|---|
| 1 | 43.304 | 0.60 | 1.92286 | 18.9 |
| 2 | 17.161 | 2.84 | 1.69680 | 55.5 |
| 3 | −40.758 | 0.15 | | |
| 4 | 8.697 | 1.54 | 1.83481 | 42.7 |
| 5 | 14.069 | (Variable) | | |
| 6 | 24.514 | 0.35 | 1.91082 | 35.3 |
| 7 | 4.414 | 1.67 | | |
| 8 | −6.187 | 0.30 | 1.80400 | 46.6 |
| 9 | 9.946 | 0.69 | | |
| 10 | 14.456 | 1.72 | 1.95906 | 17.5 |
| 11 | −27.501 | (Variable) | | |
| 12 (Stop) | ∞ | 0.00 | | |
| 13* | 4.049 | 1.63 | 1.76802 | 49.2 |
| 14* | −21.633 | 0.15 | | |
| 15 | 8.016 | 0.35 | 1.85478 | 24.8 |
| 16 | 3.391 | (Variable) | | |
| 17* | 8.435 | 2.08 | 1.76802 | 49.2 |
| 18 | −4.842 | 0.30 | 1.95906 | 17.5 |
| 19 | −11.749 | (Variable) | | |
| 20 | ∞ | 0.80 | 1.51000 | 60.0 |
| 21 | ∞ | 1.10 | | |

Aspherical surface data

Thirteenth surface

K = 0.00000e+000    A4 = −1.52327e−003    A6 = −5.24695e−005
A8 = 2.49217e−006    A10 = −5.87029e−007

Fourteenth surface

K = 0.00000e+000    A4 = 1.15533e−003    A6 = −3.02110e−005

-continued

[Numerical data 4]
Unit mm

Seventeenth surface

K = 0.00000e+000   A4 = −2.97933e−004   A6 = 1.62860e−005
A8 = −9.39247e−006   A10 = 5.61671e−007

Zoom ratio 4.85

|  | Wide angle | Intermediate | Telephoto |
|---|---|---|---|
| Focal length | 3.29 | 8.02 | 15.96 |
| F-number | 1.81 | 1.85 | 1.85 |
| Half angle of field (degree) | 25.58 | 11.11 | 5.64 |
| Image height | 1.58 | 1.58 | 1.58 |
| Total lens length | 29.34 | 29.34 | 29.34 |
| BF | 4.14 | 4.81 | 3.99 |
| d5 | 0.89 | 5.04 | 7.38 |
| d11 | 7.19 | 3.04 | 0.70 |
| d16 | 2.74 | 2.07 | 2.89 |
| d19 | 2.51 | 3.18 | 2.36 |

[Numerical data 5]
Unit mm

Surface data

| Surface number | r | d | nd | vd |
|---|---|---|---|---|
| 1 | 24.084 | 0.60 | 1.95906 | 17.5 |
| 2 | 12.225 | 2.77 | 1.77250 | 49.6 |
| 3 | 79.426 | 0.15 | | |
| 4 | 11.052 | 1.82 | 1.91082 | 35.3 |
| 5 | 29.345 | (Variable) | | |
| 6 | 31.941 | 0.35 | 1.83481 | 42.7 |
| 7 | 3.656 | 2.04 | | |
| 8 | −10.025 | 0.30 | 1.59522 | 67.7 |
| 9 | 6.690 | 0.60 | | |
| 10 | 6.708 | 0.81 | 1.95906 | 17.5 |
| 11 | 13.925 | (Variable) | | |
| 12 (Stop) | ∞ | 0.00 | | |
| 13* | 4.843 | 1.20 | 1.69350 | 53.2 |
| 14 | 6.403 | (Variable) | | |
| 15* | 7.051 | 2.73 | 1.69350 | 53.2 |
| 16* | −8.235 | 0.62 | | |
| 17 | −31.782 | 0.30 | 1.95906 | 17.5 |
| 18 | 7.847 | 1.60 | 1.77250 | 49.6 |
| 19 | −9.863 | (Variable) | | |
| 20 | ∞ | 0.80 | 1.51000 | 60.0 |
| 21 | ∞ | 1.10 | | |

Aspherical surface data

Thirteenth surface

K = 0.00000e+000   A4 = −8.86159e−004   A6 = −7.29559e−005
A8 = −3.33828e−006   A10 = 2.56347e−007

Fifteenth surface

K = 0.00000e+000   A4 = −8.55322e−004   A6 = 1.87145e−004
A8 = −1.71454e−005   A10 = 2.49834e−006

Sixteenth surface

K = 0.00000e+000   A4 = 1.87063e−003   A6 = −1.60206e−005
A8 = 2.64238e−005   A10 = −6.84566e−007

Zoom ratio 4.85

|  | Wide angle | Intermediate | Telephoto |
|---|---|---|---|
| Focal length | 2.77 | 7.04 | 13.43 |
| F-number | 1.70 | 1.84 | 1.78 |
| Half angle of field (degree) | 29.62 | 12.60 | 6.69 |

[Numerical data 5]
Unit mm

| Image height | 1.58 | 1.58 | 1.58 |
|---|---|---|---|
| Total lens length | 29.51 | 29.51 | 29.51 |
| BF | 4.44 | 5.19 | 4.94 |
| d5 | 0.52 | 4.48 | 6.71 |
| d11 | 6.89 | 2.93 | 0.70 |
| d14 | 1.79 | 1.04 | 1.29 |
| d19 | 2.81 | 3.56 | 3.31 |

[Numerical data 6]
Unit mm

Surface data

| Surface number | r | d | nd | vd |
|---|---|---|---|---|
| 1 | 25.889 | 0.60 | 1.95906 | 17.5 |
| 2 | 12.411 | 0.41 | | |
| 3 | 13.052 | 2.52 | 1.72916 | 54.7 |
| 4 | 135.450 | 0.15 | | |
| 5 | 11.165 | 1.88 | 1.91082 | 35.3 |
| 6 | 37.394 | (Variable) | | |
| 7 | 37.584 | 0.35 | 1.83481 | 42.7 |
| 8 | 3.744 | 1.94 | | |
| 9 | −9.743 | 0.30 | 1.59522 | 67.7 |
| 10 | 6.983 | 0.60 | | |
| 11 | 7.029 | 0.80 | 1.95906 | 17.5 |
| 12 | 15.544 | (Variable) | | |
| 13 (Stop) | ∞ | 0.00 | | |
| 14* | 3.840 | 1.79 | 1.69350 | 53.2 |
| 15 | 4.127 | (Variable) | | |
| 16* | 6.158 | 1.54 | 1.69350 | 53.2 |
| 17* | −6.880 | 0.73 | | |
| 18 | −11.247 | 0.30 | 1.95906 | 17.5 |
| 19 | 12.353 | 1.56 | 1.77250 | 49.6 |
| 20 | −7.805 | (Variable) | | |
| 21 | ∞ | 0.80 | 1.51000 | 60.0 |
| 22 | ∞ | 1.10 | | |

Aspherical surface data

Fourteenth surface

K = 0.00000e+000   A4 = −1.48044e−003   A6 = −2.76028e−005
A8 = −1.12491e−005   A10 = 3.42769e−007

Sixteenth surface

K = 0.00000e+000   A4 = −1.25215e−003   A6 = 1.54876e−004
A8 = −3.90152e−005   A10 = 7.59898e−006

Seventeenth surface

K = 0.00000e+000   A4 = 1.46625e−003   A6 = 1.86929e−004
A8 = −5.88336e−005   A10 = 1.03057e−005

Zoom ratio 4.85

|  | Wide angle | Intermediate | Telephoto |
|---|---|---|---|
| Focal length | 2.77 | 7.13 | 13.44 |
| F-number | 1.69 | 1.84 | 1.75 |
| Half angle of field (degree) | 29.62 | 12.46 | 6.69 |
| Image height | 1.58 | 1.58 | 1.58 |
| Total lens length | 29.55 | 29.55 | 29.55 |
| BF | 4.51 | 5.27 | 4.86 |
| d6 | 0.50 | 4.50 | 6.75 |
| d12 | 6.95 | 2.95 | 0.70 |
| d15 | 2.11 | 1.35 | 1.76 |
| d20 | 2.88 | 3.64 | 3.23 |

[Numerical data 7]
Unit mm

Surface data

| Surface number | r | d | nd | vd |
|---|---|---|---|---|
| 1 | 40.618 | 0.60 | 1.95906 | 17.5 |
| 2 | 19.207 | 2.56 | 1.77250 | 49.6 |
| 3 | −64.962 | 0.15 | | |
| 4 | 9.419 | 1.76 | 1.77250 | 49.6 |
| 5 | 15.871 | (Variable) | | |
| 6 | 22.381 | 0.35 | 1.91082 | 35.3 |
| 7 | 4.385 | 1.87 | | |
| 8 | −6.713 | 0.30 | 1.77250 | 49.6 |
| 9 | 7.619 | 0.58 | | |
| 10 | 10.220 | 0.93 | 1.95906 | 17.5 |
| 11 | −78.242 | (Variable) | | |
| 12 (Stop) | ∞ | 0.00 | | |
| 13* | 4.247 | 1.96 | 1.76802 | 49.2 |
| 14* | −12.738 | 0.15 | | |
| 15 | 17.148 | 0.35 | 1.85478 | 24.8 |
| 16 | 4.072 | (Variable) | | |
| 17* | 8.435 | 1.97 | 1.76802 | 49.2 |
| 18 | −5.401 | 0.30 | 1.95906 | 17.5 |
| 19 | −11.557 | (Variable) | | |
| 20 | ∞ | 0.80 | 1.51000 | 60.0 |
| 21 | ∞ | 1.10 | | |

Aspherical surface data

Thirteenth surface $K = 0.00000e+000$  $A4 = -1.33532e-003$  $A6 = -8.94428e-005$
$A8 = 1.33608e-005$  $A10 = -1.41087e-006$ Fourteenth surface $K = 0.00000e+000$  $A4 = 1.69663e-003$  $A6 = -6.03799e-005$ Seventeenth surface $K = 0.00000e+000$  $A4 = -5.66209e-004$  $A6 = 4.67397e-005$
$A8 = -2.10539e-005$  $A10 = 1.15405e-006$ Zoom ratio 5.82

| | Wide angle | Intermediate | Telephoto |
|---|---|---|---|
| Focal length | 3.09 | 8.32 | 17.97 |
| F-number | 1.78 | 1.85 | 1.85 |
| Half angle of field (degree) | 27.02 | 10.71 | 5.01 |
| Image height | 1.58 | 1.58 | 1.58 |
| Total lens length | 29.41 | 29.41 | 29.41 |
| BF | 4.23 | 5.21 | 4.44 |
| d5 | 0.65 | 5.31 | 7.93 |
| d11 | 7.98 | 3.32 | 0.70 |
| d16 | 2.71 | 1.73 | 2.50 |
| d19 | 2.60 | 3.58 | 2.81 |

[Numerical data 8]
Unit mm

Surface data

| Surface number | r | d | nd | vd |
|---|---|---|---|---|
| 1 | 37.306 | 0.60 | 1.95906 | 17.5 |
| 2 | 18.240 | 2.69 | 1.77250 | 49.6 |
| 3 | −76.515 | 0.15 | | |
| 4 | 9.452 | 1.94 | 1.77250 | 49.6 |
| 5 | 16.423 | (Variable) | | |
| 6 | 16.752 | 0.35 | 1.91082 | 35.3 |
| 7 | 4.302 | 1.95 | | |
| 8 | −7.229 | 0.30 | 1.77250 | 49.6 |
| 9 | 5.988 | 0.55 | | |
| 10 | 8.062 | 0.96 | 1.95906 | 17.5 |
| 11 | 113.427 | (Variable) | | |
| 12 (Stop) | ∞ | 0.00 | | |
| 13* | 4.199 | 1.83 | 1.76802 | 49.2 |
| 14* | −14.821 | 0.15 | | |
| 15 | 11.835 | 0.35 | 1.85478 | 24.8 |
| 16 | 3.747 | (Variable) | | |
| 17* | 8.435 | 1.94 | 1.76802 | 49.2 |
| 18 | −5.344 | 0.30 | 1.95906 | 17.5 |
| 19 | −11.293 | (Variable) | | |
| 20 | ∞ | 0.80 | 1.51000 | 60.0 |
| 21 | ∞ | 1.10 | | |

Aspherical surface data

Thirteenth surface $K = 0.00000e+000$  $A4 = -1.49782e-003$  $A6 = -8.20538e-005$
$A8 = 1.24003e-005$  $A10 = -1.32609e-006$ Fourteenth surface $K = 0.00000e+000$  $A4 = 1.36332e-003$  $A6 = -3.89305e-005$ Seventeenth surface $K = 0.00000e+000$  $A4 = -3.05995e-004$  $A6 = -9.32580e-005$
$A8 = 2.86291e-005$  $A10 = -3.68445e-006$ Zoom ratio 6.80

| | Wide angle | Intermediate | Telephoto |
|---|---|---|---|
| Focal length | 3.09 | 8.92 | 21.00 |
| F-number | 1.78 | 1.85 | 1.85 |
| Half angle of field (degree) | 27.02 | 10.01 | 4.29 |
| Image height | 1.58 | 1.58 | 1.58 |
| Total lens length | 29.80 | 29.80 | 29.80 |
| BF | 4.34 | 5.33 | 3.94 |
| d5 | 0.50 | 5.24 | 7.91 |
| d11 | 8.10 | 3.35 | 0.69 |
| d16 | 2.82 | 1.82 | 3.22 |
| d19 | 2.71 | 3.70 | 2.31 |

[Numerical data 9]
Unit mm

Surface data

| Surface number | r | d | nd | vd |
|---|---|---|---|---|
| 1 | 21.241 | 0.60 | 1.92286 | 18.9 |
| 2 | 11.862 | 2.50 | 1.59522 | 67.7 |
| 3 | 86.443 | 0.15 | | |
| 4 | 12.421 | 1.86 | 1.91082 | 35.3 |
| 5 | 36.855 | (Variable) | | |
| 6 | 33.489 | 0.35 | 1.83481 | 42.7 |
| 7 | 3.493 | 1.91 | | |
| 8 | −11.590 | 0.30 | 1.59522 | 67.7 |
| 9 | 7.910 | 0.10 | | |
| 10 | 6.328 | 1.02 | 1.92286 | 18.9 |
| 11 | 18.159 | (Variable) | | |
| 12 (Stop) | ∞ | 0.00 | | |
| 13* | 4.030 | 2.39 | 1.76802 | 49.2 |
| 14* | −9.473 | 0.15 | | |
| 15 | 81.986 | 0.35 | 1.85478 | 24.8 |
| 16 | 3.839 | (Variable) | | |
| 17* | 8.435 | 1.47 | 1.76802 | 49.2 |
| 18 | −8.231 | 0.30 | 1.95906 | 17.5 |
| 19 | −16.551 | (Variable) | | |
| 20 | ∞ | 0.80 | 1.51000 | 60.0 |
| 21 | ∞ | 1.10 | | |

-continued

[Numerical data 9]
Unit mm

Aspherical surface data

Thirteenth surface

K = 0.00000e+000  A4 = −1.44701e−003  A6 = 5.78416e−005
A8 = −5.51546e−006  A10 = 8.28081e−007

Fourteenth surface

K = 0.00000e+000  A4 = 2.73274e−003  A6 = 1.12301e−004

Seventeenth surface

K = 0.00000e+000  A4 = 5.07189e−004  A6 = −4.63233e−004
A8 = 1.41768e−004  A10 = −1.65697e−005

Various data
Zoom ratio 10.10

| | | | |
|---|---|---|---|
| Focal length | 3.09 | 10.29 | 31.19 |
| F-number | 1.85 | 2.02 | 2.47 |
| Half angle of field (degree) | 27.02 | 8.70 | 2.89 |
| Image height | 1.58 | 1.58 | 1.58 |
| Total lens length | 31.80 | 31.80 | 31.80 |
| BF | 4.45 | 5.77 | 2.21 |
| d5 | 0.46 | 6.65 | 10.13 |
| d11 | 10.33 | 4.14 | 0.67 |
| d16 | 3.11 | 1.79 | 5.34 |
| d19 | 2.82 | 4.14 | 0.58 |

TABLE 1

| Conditional Expression | Numerical Example | | | | | | | | |
|---|---|---|---|---|---|---|---|---|---|
| | 1 | 2 | 3 | 4 | 5 | 6 | 7 | 8 | 9 |
| (1) | 17.47 | 17.47 | 17.98 | 18.90 | 17.47 | 17.47 | 17.47 | 17.47 | 18.90 |
| (2) | 1.881 | 1.881 | 1.872 | 1.818 | 1.881 | 1.866 | 1.835 | 1.835 | 1.810 |
| (3) | 4.205 | 4.111 | 4.007 | 3.979 | 4.372 | 4.100 | 4.437 | 4.532 | 4.419 |
| (4) | 5.783 | 4.917 | 4.843 | 4.560 | 5.393 | 5.180 | 5.147 | 5.048 | 5.568 |
| (5) | 2.192 | 2.037 | 1.844 | 1.920 | 2.641 | 2.713 | 2.115 | 2.097 | 2.107 |
| (6) | 1.919 | 2.018 | 2.173 | 2.072 | 1.655 | 1.511 | 2.097 | 2.161 | 2.097 |
| (7) | 1.375 | 1.196 | 1.209 | 1.146 | 1.234 | 1.264 | 1.160 | 1.114 | 1.260 |
| (8) | 2.947 | 3.512 | 3.250 | 2.922 | 2.797 | 2.580 | 3.133 | 2.902 | 3.369 |

As described above, according to each Example, it is possible to obtain a zoom lens that is a bright magnification-varying optical system having a large aperture ratio and has high optical characteristics over the entire zoom range while being small as a whole, and an image pickup apparatus including the zoom lens.

Next, a monitoring camera (image pickup apparatus) according to an embodiment of the present invention, which uses the zoom lens of the present invention, is described with reference to FIG. 19. In FIG. 19, there are illustrated a monitoring camera body 10, an image pickup optical system 11, which is formed of the zoom lens of the present invention, an image pickup element 12 configured to receive light of images formed by the zoom lens, a recording unit 13 configured to record information, and a network cable 14 for information transmission. Through application of the zoom lens of the present invention to the monitoring camera in this manner, a small image pickup apparatus having high optical characteristics can be achieved. When an electronic image pickup element, e.g., a CMOS is used as the image pickup element, the quality of output images can be further improved by electronically correct aberrations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-186577, filed Sep. 24, 2015, which is hereby incorporated by reference herein in its entirety.

What is claimed is:

1. A zoom lens comprising, in order from an object side to an image side:
a first lens unit having a positive refractive power;
a second lens unit having a negative refractive power;
a third lens unit having a positive refractive power; and
a fourth lens unit having a positive refractive power,
wherein during zooming, the first lens unit and the third lens unit are configured to not move, and the second lens unit and the fourth lens unit are configured to move with loci different from each other,
wherein the first lens unit consists of, in order from the object side to the image side, a negative lens G11, a positive lens G12, and a positive lens G13, and
wherein the following conditional expressions are satisfied:

$$15.0 < v1n < 19.0;$$

$$1.7 < N1\text{ave} < 2.5; \text{ and}$$

$$2.0 < |f1/f2| < 5.0,$$

where $v1n$ represents an Abbe number of a material of the negative lens G11, N1ave represents an average value of refractive indices of materials of three lenses included in the first lens unit, f1 represents a focal length of the first lens unit, and f2 represents a focal length of the second lens unit.

2. A zoom lens according to claim 1, wherein the following conditional expression is satisfied:

$$3.0 < f1/fw < 7.0,$$

where fw represents a focal length of the zoom lens at a wide angle end.

3. A zoom lens according to claim 1, wherein the following conditional expression is satisfied:

$$1.0 < f1/f4 < 4.0,$$

where f4 represents a focal length of the fourth lens unit.

4. A zoom lens according to claim 1, wherein the following conditional expression is satisfied:

$$1.0 < |f4/f2| < 3.0,$$

where f4 represents a focal length of the fourth lens unit.

5. A zoom lens according to claim 1, wherein the following conditional expression is satisfied:

$$0.7 < |f2/fw| < 2.0,$$

where fw represents a focal length of the zoom lens at a wide angle end.

6. A zoom lens according to claim 1, wherein the following conditional expression is satisfied:

$$2.0 < f1/D1 < 5.0,$$

where D1 represents a distance on an optical axis from a lens surface of the first lens unit that is closest to the object side to a lens surface of the first lens unit that is closest to the image side.

7. A zoom lens according to claim 1, wherein:
the third lens unit consists of a positive lens G31 and a negative lens G32, and
at least one lens surface of the positive lens G31 has an aspherical shape.

8. A zoom lens according to claim 1, wherein:
the third lens unit consists of a positive lens G31, and
at least one lens surface of the positive lens G31 has an aspherical shape.

9. A zoom lens according to claim 1, further comprising:
an aperture stop arranged one of between the second lens unit and the third lens unit, and inside the third lens unit,
wherein the aperture stop is configured to not move during zooming.

10. A zoom lens according to claim 1, wherein the second lens unit consists of, in order from the object side to the image side, a negative lens, a negative lens, and a positive lens.

11. A zoom lens according to claim 1, wherein the fourth lens unit consists of a cemented lens obtained by cementing a positive lens and a negative lens.

12. A zoom lens according to claim 1, wherein the fourth lens unit consists of, in order from the object side to the image side, a positive lens, and a cemented lens composed of a negative lens and a positive lens.

13. A zoom lens according to claim 1, wherein during zooming from a wide angle end to a telephoto end, the second lens unit is configured to move toward the image side, and the fourth lens unit is configured to move toward the object side and then move toward the image side.

14. A zoom lens according to claim 1, wherein the zoom lens consists of, in order from the object side to the image side, the first lens unit having a positive refractive power, the second lens unit having a negative refractive power, the third lens unit having a positive refractive power, and the fourth lens unit having a positive refractive power.

15. An image pickup apparatus comprising:
an image pickup device; and
the zoom lens according to claim 1,
wherein the zoom lens directs an image to the image pickup device.

16. A zoom lens comprising, in order from an object side to an image side:
a first lens unit having a positive refractive power;
a second lens unit having a negative refractive power;
a third lens unit having a positive refractive power; and
a fourth lens unit having a positive refractive power,
wherein during zooming, the first lens unit and the third lens unit are configured to not move, and the second lens unit and the fourth lens unit are configured to move with loci different from each other,
wherein the first lens unit consists of, in order from the object side to the image side, a negative lens G11, a positive lens G12, and a positive lens G13,
wherein the third lens unit consists of a positive lens G31,
wherein at least one lens surface of the positive lens G31 has an aspherical shape, and
wherein the following conditional expressions are satisfied:

$$15.0 < v1n < 22.0;$$

$$1.7 < N1\text{ave} < 2.5; \text{ and}$$

$$2.0 < |f1/f2| < 5.0,$$

where v1n represents an Abbe number of a material of the negative lens G11, N1ave represents an average value of refractive indices of materials of three lenses included in the first lens unit, f1 represents a focal length of the first lens unit, and f2 represents a focal length of the second lens unit.

17. A zoom lens comprising, in order from an object side to an image side:
a first lens unit having a positive refractive power;
a second lens unit having a negative refractive power;
a third lens unit having a positive refractive power; and
a fourth lens unit having a positive refractive power,
wherein during zooming, the first lens unit and the third lens unit are configured to not move, and the second lens unit and the fourth lens unit are configured to move with loci different from each other,
wherein the first lens unit consists of, in order from the object side to the image side, a negative lens G11, a positive lens G12, and a positive lens G13,
wherein the fourth lens unit consists of, in order from the object side to the image side, a positive lens, and a cemented lens composed of a negative lens and a positive lens, and
wherein the following conditional expressions are satisfied:

$$15.0 < v1n < 22.0;$$

$$1.7 < N1\text{ave} < 2.5; \text{ and}$$

$$2.0 < |f1/f2| < 5.0,$$

where v1n represents an Abbe number of a material of the negative lens G11, N1ave represents an average value of refractive indices of materials of three lenses included in the first lens unit, f1 represents a focal length of the first lens unit, and f2 represents a focal length of the second lens unit.

* * * * *